US008963470B2

(12) United States Patent
Kimura et al.

(10) Patent No.: US 8,963,470 B2
(45) Date of Patent: Feb. 24, 2015

(54) MOTOR CONTROL APPARATUS

(71) Applicant: Denso Corporation, Kariya, Aichi-pref. (JP)

(72) Inventors: Kiyoshi Kimura, Kariya (JP); Jun Yamada, Nagoya (JP); Masaaki Shinojima, Chiryu (JP)

(73) Assignee: Denso Corporation, Kariya (JP)

( * ) Notice: Subject to any disclaimer, the term of this patent is extended or adjusted under 35 U.S.C. 154(b) by 186 days.

(21) Appl. No.: 13/714,822

(22) Filed: Dec. 14, 2012

(65) Prior Publication Data

US 2013/0154537 A1 Jun. 20, 2013

(30) Foreign Application Priority Data

Dec. 16, 2011 (JP) ................. 2011-275289

(51) Int. Cl.
G05B 13/00 (2006.01)
G05B 13/02 (2006.01)
(52) U.S. Cl.
CPC ............ *G05B 13/02* (2013.01); *G05B 13/0265* (2013.01)
USPC ............................ 318/561; 318/603; 318/600
(58) Field of Classification Search
USPC .......... 318/561, 603, 600, 563, 560, 567, 602
See application file for complete search history.

(56) References Cited

U.S. PATENT DOCUMENTS

| 6,067,960 | A | 5/2000 | Watanabe et al. |
| 2003/0222617 | A1 | 12/2003 | Nakai et al. |
| 2006/0207373 | A1 | 9/2006 | Amamiya et al. |
| 2007/0040530 | A1 | 2/2007 | Ryuzaki |
| 2009/0108791 | A1 | 4/2009 | Isobe et al. |
| 2010/0116722 | A1 | 5/2010 | Kurihara et al. |
| 2013/0141031 | A1* | 6/2013 | Yamada ........................ 318/603 |

FOREIGN PATENT DOCUMENTS

| JP | 8-268024 | 10/1996 |
| JP | 2002-044993 | 2/2002 |
| JP | 2008-279854 | 11/2008 |
| JP | 2011-247304 | 12/2011 |

OTHER PUBLICATIONS

Office Action (4/ pages) dated Mar. 27, 2014, issued in corresponding Japanese Application No. 2011-275289 and English translation (5 pages).
Office Action (3 pages) dated Nov. 14, 2013, issued in corresponding Japanese Application No. 2011-275289 and English translation (3 pages).

* cited by examiner

*Primary Examiner* — Karen Masih
(74) *Attorney, Agent, or Firm* — Nixon & Vanderhye PC

(57) ABSTRACT

A motor control apparatus that controls rotation of a rotor of an electric motor powered from an electric power source includes a learning portion that executes an initial drive learning process, and a controller that executes a normal drive operation to sequentially change an exciting phase of the electric motor based on a count value of a counter which is corrected by a correcting portion such that the rotor is rotated to a target position after an initial drive operation is finished. The learning portion re-executes the initial drive learning process after a predetermined condition is satisfied, when the initial drive learning process is failed.

36 Claims, 21 Drawing Sheets

MOTOR CONTROL APPARATUS

CROSS REFERENCE TO RELATED APPLICATION

This application is based on Japanese Patent Application No. 2011-275289 filed on Dec. 16, 2011, the disclosure of which is incorporated herein by reference in its entirety.

TECHNICAL FIELD

The present disclosure relates to a motor control apparatus.

BACKGROUND

Lately, many mechanical drive systems have been replaced with electrical drive systems in the automobile industry. JP-A-2004-308752 (US 2006/0207373), JP-A-2004-023932 (US 2003/0222617), JP-B2-3800529 (US 2003/0222617), or JP-A-2009-112151 (US 2009/0108791) describes a shift-by-wire type range switch control system. Specifically, when a driver of a vehicle operates a shift lever to change a shift range of a range change mechanism, the shift range is changed to a target range by controlling a motor of the vehicle based on a signal output by detecting the operation.

In this system, an output shaft is connected to a rotation shaft of the motor through a deceleration mechanism, and the output shaft drives the range change mechanism so as to switch a shift range of an automatic transmission. An encoder, which senses a rotational position of the rotor, is provided to the motor, and outputs a pulse signal. At the time of changing the shift range of the automatic transmission, the motor is rotated to a target rotational position (a target count value), which corresponds to a target range of the automatic transmission, based on a count value of the pulse signals output from the encoder.

In this type of the motor having the encoder, only the rotational amount (the rotational angle) of the rotor from a start position of the rotor can be sensed based on the count value upon the starting. Therefore, the motor cannot be normally driven unless an appropriate measure is taken to obtain a relationship between the count value and the rotational position (exciting phase) of the rotor by sensing an absolute rotational position of the rotor.

In view of the above point, according to JP-B2-3800529, an initial drive learning process is executed in an initial drive operation right after turning on an electric power source. In this learning process, the exciting phase is sequentially changed at a predetermined time schedule based on an open loop control, so that the rotational position of the rotor and the corresponding exciting phase coincide with each other at some timing (at some phase), and the pulse signals output from the encoder are counted upon the rotation of the rotor to learn a relationship among the count value of the encoder, the rotational position of the rotor and the exciting phase at the end of the initial drive operation. Thus, a correction value calculated to correct a deviation of the exciting phase (initial position) with respect to the count value can be learned.

Thereafter, in a normal drive operation, the count value is corrected using the correction value, and the exciting phase is sequentially changed in accordance with the corrected count value.

Because the initial drive learning process is executed immediately after energized, the timing of the initial drive learning process overlaps with a cranking of an engine of the vehicle. If much current flows through an electric load, such as a starter, that requires a large consumption electricity in the initial drive learning process, a voltage supplied to the motor from the power source may have a large declining, and the initial drive learning process may be failed (ended with error such as erroneous learning). If the initial drive learning process is failed, in the normal drive operation after the initial drive operation, a deviation between the count value and the rotational position of the rotor (exciting phase) cannot be corrected. In this case, the motor may not be driven normally.

In JP-A-2009-112151, the motor has an encoder that outputs an A-phase signal and a B-phase signal having a predetermined phase difference therebetween in accordance with rotation of the rotor. At the end time of the initial drive operation, it is determined whether the learning is succeeded or failed based on the pattern of the A-phase signal and the B-phase signal. If it is determined that the learning is failed, the initial drive learning process is re-executed.

However, if the voltage supplied to the motor from the power source is unstable when the initial drive learning process is re-executed, the initial drive learning process may be failed again. In this case, the initial drive learning process may be repeated in the state where the voltage is unstable, and the erroneous correction value may be learned.

SUMMARY

According to an aspect of the present disclosure, a motor control apparatus that controls rotation of a rotor of an electric motor powered from an electric power source includes an encoder, a counter, a learning portion, and a controller. The encoder outputs a pulse signal at predetermined angular intervals in response to the rotation of the rotor of the electric motor. The counter counts the pulse signal output from the encoder. The learning portion executes an initial drive learning process, in which the learning portion executes an initial drive operation to sequentially change an exciting phase of the electric motor using an open loop control after powered from the electric power source, corrects a count value of the counter by calculating a correction value based on a deviation of the exciting phase of the electric motor with respect to the count value of the counter, and learns the correction value. The controller executes a normal drive operation to sequentially change the exciting phase of the electric motor based on the count value corrected by the correcting portion such that the rotor is rotated to a target position after the initial drive operation is finished.

The learning portion re-executes the initial drive learning process after a predetermined condition is satisfied, when the initial drive learning process is failed. Alternatively, the learning portion prohibits the initial drive learning process until a predetermined condition is satisfied.

For example, the learning portion has a detecting portion which detects a voltage supplied to the motor from the electric power source, and the learning portion re-executes the initial drive learning process after a variation in the voltage becomes within a limit, when it is determined that the variation in the voltage exceeds the limit. Alternatively, the learning portion prohibits the initial drive learning process until a variation in the voltage becomes within a limit, when it is determined that the variation in the voltage exceeds the limit.

For example, the learning portion has a detecting portion which detects a current flowing through an electric load from the electric power source, and the learning portion re-executes the initial drive learning process after the current becomes lower than or equal to a predetermined value, when it is determined that the current is higher than the predetermined value. Alternatively, the learning portion prohibits the initial drive learning process until the current becomes lower than or equal to a predetermined value, when it is determined that the current is higher than the predetermined value.

For example, the learning portion has a detecting portion which detects a state of a starter used for starting an internal combustion engine, and the learning portion re-executes the initial drive learning process after the starter is turned off, when it is determined that the starter is turned on. Alternatively, the learning portion prohibits the initial drive learning process until the starter is turned off, when it is determined that the starter is turned on.

For example, the learning portion has a detecting portion which detects an operation for starting an internal combustion engine by a driver, and the learning portion re-executes the initial drive learning process when a predetermined time period is elapsed after the operation is detected, when it is determined that the operation is detected. Alternatively, the learning portion prohibits the initial drive learning process until a predetermined time period is elapsed after the operation is detected, when it is determined that the operation is detected.

For example, the learning portion has a detecting portion which detects a speed of an internal combustion engine, and the learning portion re-executes the initial drive learning process after a variation in the speed becomes within a limit, when it is determined that the variation in the speed exceeds the limit. Alternatively, the learning portion prohibits the initial drive learning process until a variation in the speed becomes within a limit, when it is determined that the variation in the speed exceeds the limit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
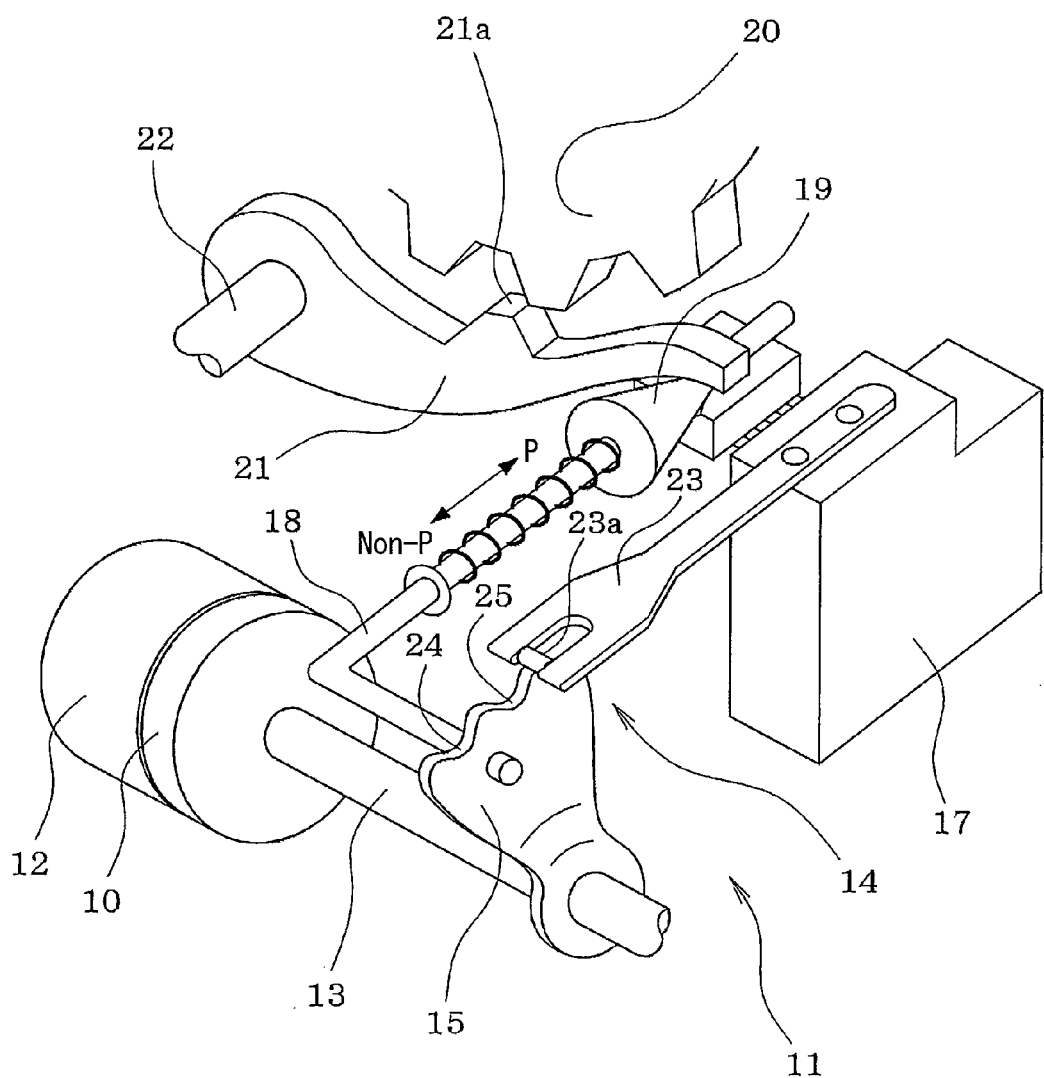
FIG. 1 is a perspective view illustrating a range change apparatus according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Embodiments will be described with reference to the accompanying drawings, in which a motor control apparatus of the present disclosure is applied to a range change apparatus of an automatic transmission.

First Embodiment

A first embodiment will be described with reference to FIGS. 1 to 10. First, a structure of a range change mechanism 11 will be schematically described with reference to FIG. 1.

An electric motor 12, which serves as a drive source of the range change mechanism 11, may be, for example, a switched reluctance (SR) motor. The motor 12 includes a speed reducing mechanism 26 (see FIG. 4), which reduces a rotational speed of a rotor of the motor 12. Furthermore, an output shaft sensor 10 is provided to the motor 12 to sense a rotational position of an output shaft 13 of the motor 12. A detent lever 15 is fixed to the output shaft 13.

A parking rod 18, which is configured into an L-shape, is fixed to the detent lever 15. A conical body 19, which is provided at a distal end portion of the parking rod 18, contacts a lock lever 21. The lock lever 21 is pivoted upward or downward about a shaft 22 depending on a position of the conical body 19 to lock or unlock a parking gear 20. The parking gear 20 is provided to an output shaft of an automatic transmission 27. When the parking gear 20 is locked by the lock lever 21, a driving wheel of the vehicle is held in a non-rotatable state (a parking state).

A detent spring 23 is fixed to a support base 17 to hold the detent lever 15 to a parking range (hereinafter, referred to as a P-range) as well as to another range (hereinafter, referred to as a Non-P-range). When an engaging portion 23a, which is provided to a distal end of the detent spring 23, is fitted into a P-range holding recess 24 of the detent lever 15, the detent lever 15 is held in a position of the P-range. Alternatively, when the engaging portion 23a of the detent spring 23 is fitted into a Non-P-range holding recess 25 of the detent lever 15, the detent lever 15 is held in a position of the Non-P-range. A detect mechanism 14 is defined by the detent lever 15 and the detent spring 23, and maintains the rotational position of the detent lever 15 at each range position.

In the P-range, the parking rod 18 is moved toward the lock lever 21, so that a large diameter portion of the conical body 19 pushes the lock lever 21 upward. Thereby, a protrusion 21a of the lock lever 21 is received in the parking gear 20 to lock the parking gear 20. In this way, the output shaft of the automatic transmission 27 (the drive wheel) is placed in the locked state (the parking state).

In the Non-P-range, the parking rod 18 is moved in a direction away from the lock lever 21. Thereby, the large diameter portion of the conical body 19 is removed from the lock lever 21, so that the lock lever 21 is pivoted downward. In this way, the protrusion 21a of the lock lever 21 is released from the parking gear 20 to unlock the parking gear 20. Therefore, the output shaft of the automatic transmission 27 is held in the rotatable state (drivable state of the vehicle).

The output shaft sensor 10 is a rotation sensor (e.g., a potentiometer), which outputs a voltage that corresponds to a rotational angle of the output shaft 13 of the speed reducing mechanism 26 of the motor 12. Based on the output voltage of the output shaft sensor 14, it is possible to determine which one of the P-range and the Non-P-range is the current range.

Figure 2:
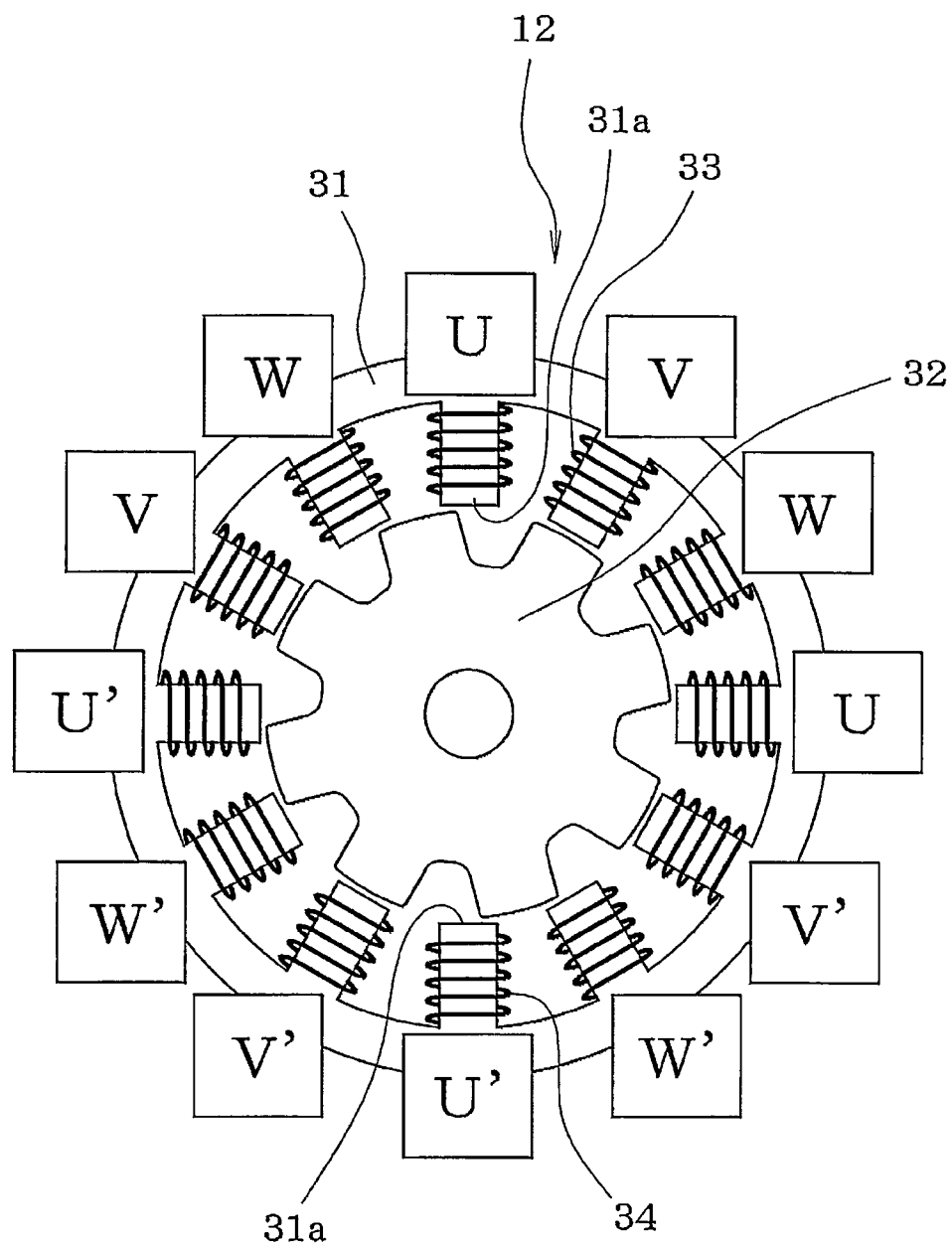
FIG. 2 is a diagram illustrating a structure of a motor of the range change apparatus of the first embodiment.

Next, a structure of the motor 12 will be described with reference to FIG. 2.

In the first embodiment, the switched reluctance motor (hereinafter, referred to as a SR motor) is used as the motor 12. In the SR motor 12, both of a stator 31 and a rotor 32 have salient poles, so that a permanent magnet is not required, thereby implementing the simple structure.

For example, twelve salient poles 31a are arranged one after another at generally equal intervals at an inner peripheral portion of the cylindrical stator 31. Furthermore, for example, eight salient poles 32a are arranged one after another at generally equal intervals at an outer peripheral portion of the rotor 32. When the rotor 32 is rotated, each of the salient poles 32a of the rotor 32 is displaced to sequentially radially oppose the respective salient poles 31a of the stator 31 while a minute gap is interposed between the salient pole 32a of the rotor 32 and the opposed salient pole 31a of the stator 32.

Six windings 33 of a U-phase, a V-phase and a W-phase and six windings 34 of a U'-phase, a V'-phase and a W-phase are wound sequentially at the twelve salient poles 31a of the stator 31. It should be understood that the number of the salient poles 31a of the stator 31 and the number of the salient poles 32a of the rotor 32 may be changed to any other suitable numbers.

Figure 3:
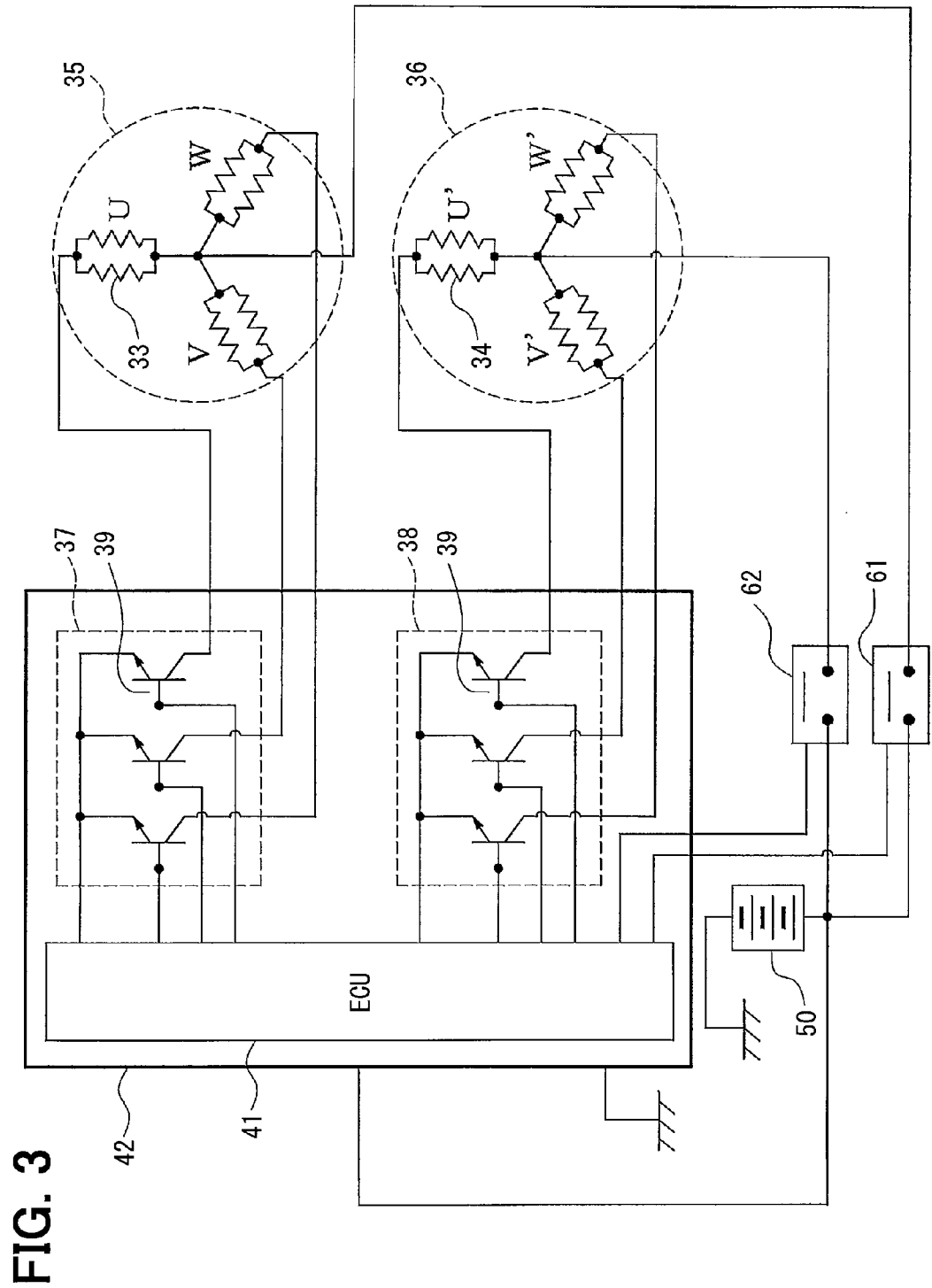
FIG. 3 is a circuit diagram illustrating a circuit structure, which drives the motor, according to the first embodiment.

In the first embodiment, the winding sequence of the windings 33, 34 relative to the twelve salient poles 31a is in an order of the V-phase, the W-phase, the U-phase, the V-phase, the W-phase, the U-phase, the V'-phase, the W-phase, the U'-phase, the V'-phase, the W-phase and the U'-phase. As shown in FIG. 3, the six windings 33 of the U-phase, the V-phase and the W-phase and the six windings 33 of the U'-phase, the V'-phase and the W-phase are electrically connected to form two systems of motor exciting arrangements 35, 36.

In the one motor exciting arrangement 35, the six windings 33 of the U-phase, the V-phase and the W-phase are electrically connected to form a Y-connection (two windings 33 of the same phase being connected in parallel). In the other motor exciting arrangement 36, the six windings 34 of the U'-phase, the V'-phase and the W-phase are electrically connected to form a Y-connection (two windings 34 of the same phase being connected in parallel). In the two motor exciting arrangements 35, 36, the U-phase and the U'-phase are energized simultaneously, and the V-phase and the V'-phase are energized simultaneously. Furthermore, the W-phase and the W-phase are energized simultaneously.

These two motor exciting arrangements 35, 36 are driven by separate motor drivers 37, 38, respectively, while a battery 50 of the vehicle is used as an electric power source. Neutral point of the motor exciting arrangement 35 is connected to a positive terminal of the battery 50 through a relay 61, and neutral point of the motor exciting arrangement 36 is connected to the positive terminal of the battery 50 through a relay 62. The relay 61, 62 is turned on while the motor 12 is driven.

In the case where the two systems of the motor exciting arrangements 35, 36 and of the motor drivers 37, 38 are provided, even when one of the two systems fails, the other one of the two systems can be used to rotate the motor 12. In the exemplary circuit structure of the motor drivers 37, 38 shown in FIG. 3, there is provided a unipolar drive circuit structure, in which one switching element (e.g., a transistor) 39 is provided for each of the phases. Alternatively, it is possible to provide a bipolar drive circuit structure, in which two switching elements are provided for each of the phases. Also, it should be noted that only one system of the motor exciting arrangement and of the motor driver may be alternatively used.

Figure 4:
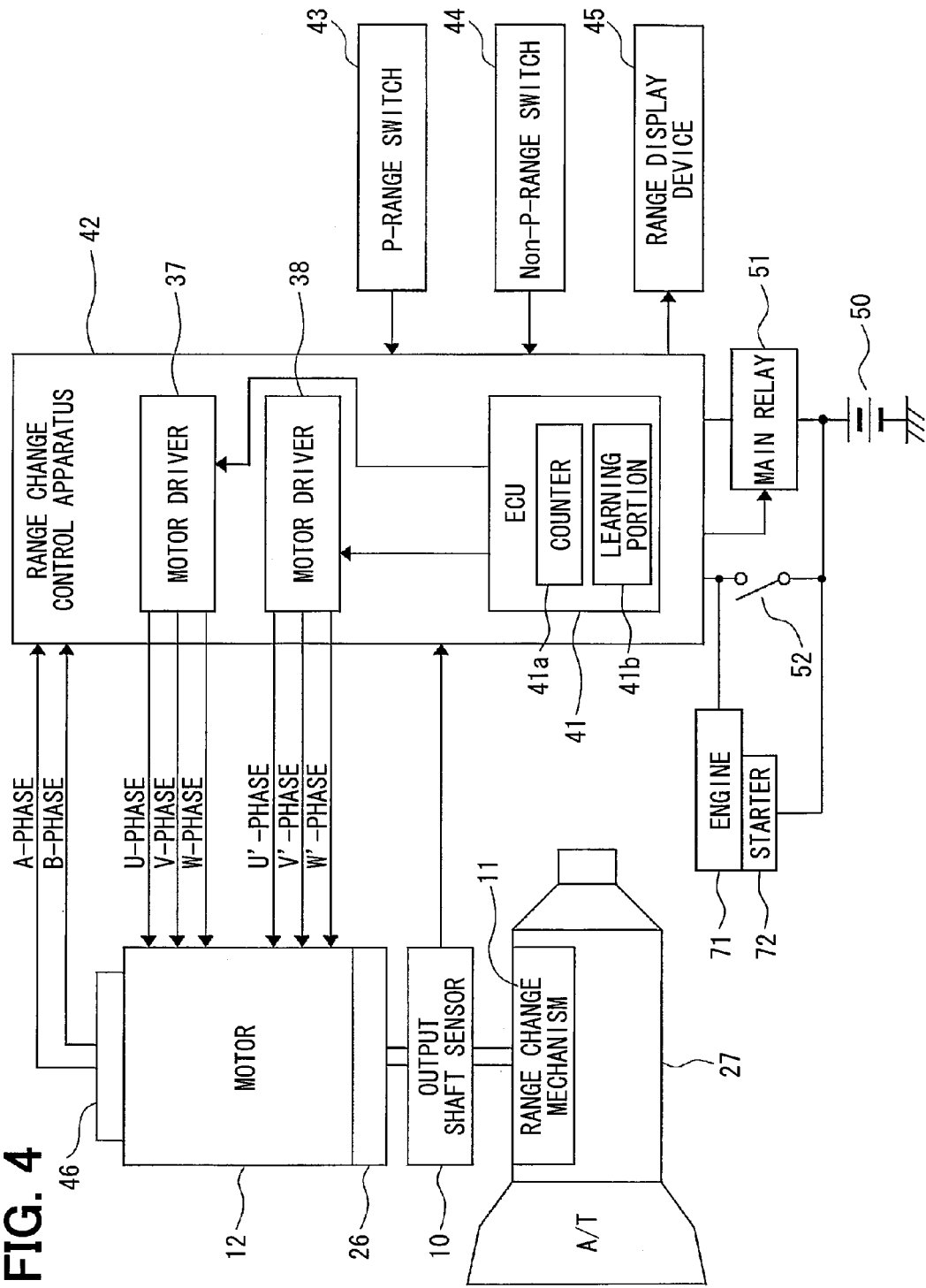
FIG. 4 is a schematic diagram illustrating an entire control system structure of the range change apparatus according to the first embodiment.

Turning on/off of each switching element 39 of each motor driver 37, 38 is controlled by an electronic control unit (ECU) 41. As shown in FIG. 4, the ECU 41 and the motor drivers 37, 38 are installed in a range change control apparatus 42 which may correspond to a motor control apparatus. An operational signal of a P-range switch 43, which is manipulated to change the range to the P-range, and an operational signal of a Non-P-range switch 44, which is manipulated to change the range to the Non-P-range, are supplied to the range change control apparatus 42. The selected range, which is selected by the manipulation of the P-range switch 43 or the Non-P-range switch 44, is displayed on a range display device 45 that is provided to an instrument panel (not shown), after the shift range is switched by the motor 12.

The range change control apparatus 42 is powered from the battery 50 through a main relay 51 (power switch). On/off of the main relay 51 is switched by on/off of an ignition switch 52. When the ignition switch 52 is turned on, the main relay 51 is turned on and electricity is supplied to the range change control apparatus 42. When the ignition switch 52 is turned off, the main relay 51 is turned off after a predetermined time period (necessary for a finishing process of each control program), and the electricity supplied to the range change control apparatus 42 is stopped.

Figure 5:
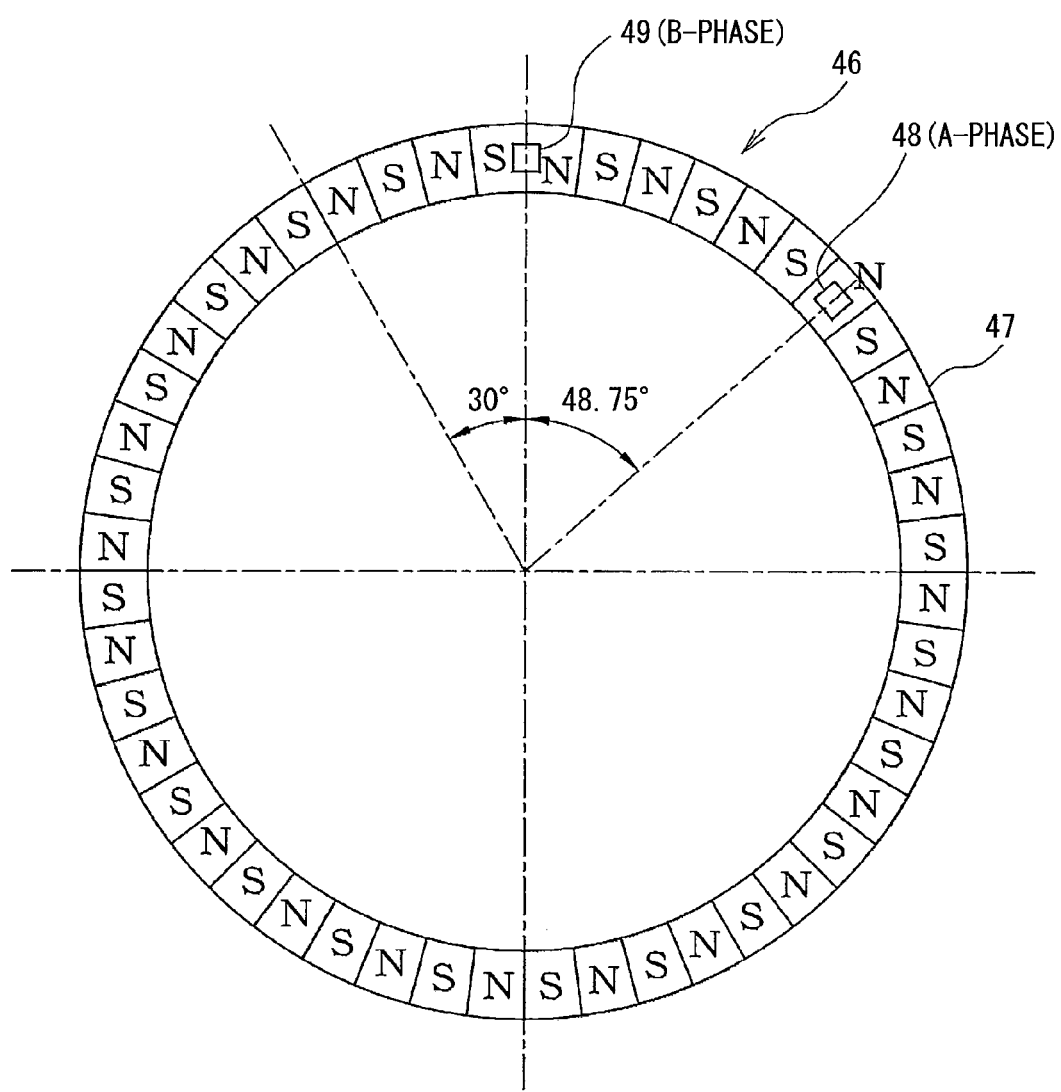
FIG. 5 is a plan view illustrating a structure of a rotary magnet of an encoder provided to the motor of the first embodiment.
Figure 6:
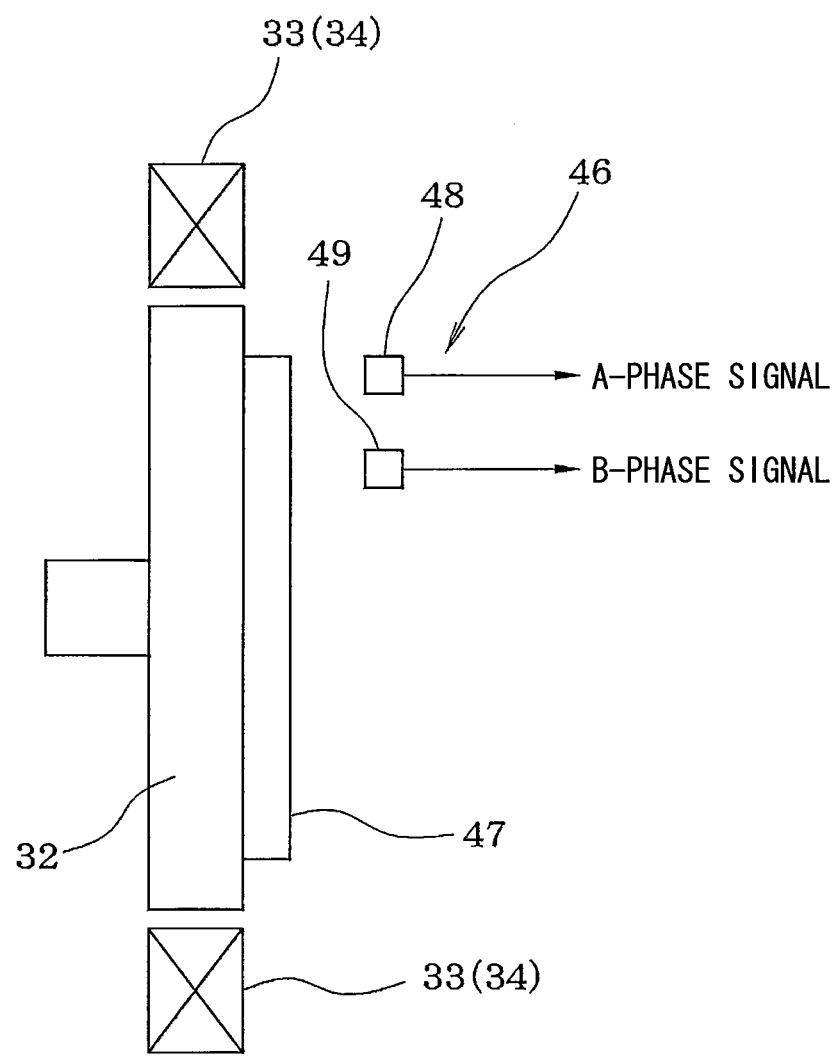
FIG. 6 is a lateral view of the encoder of the first embodiment.

An encoder 46 is provided to the motor 12 to sense a rotational position of the rotor 32. The encoder 46 is, for example, a magnetic rotary encoder. Specifically, as shown in FIGS. 5 and 6, an annular rotary magnet 47, in which N-poles and S-poles are alternately arranged one after another at equal pitches in a circumferential direction, is coaxially fixed to a side surface of the rotor 32. Each of two magnetic sensing elements (e.g., Hall ICs) 48, 49 is arranged at a corresponding location that opposes the rotary magnet 47.

In the first embodiment, a pole pitch (a magnetizing pitch) between the adjacent N-pole and S-pole in the rotary magnet 47 is set to be 7.5 degrees. This pole pitch (7.5 degrees) of the rotary magnet 47 is set to be the same angle as the rotational angle of the rotor 32 per excitation of the motor 12. As will be described later, when the exciting phase(s) of the SR motor 12, which is being excited, is sequentially changed six times in the 1-2 phase excitation mode, the rotor 32 and the rotary magnet 47 are integrally rotated by 45 degrees (i.e., 7.5 degrees×6=45 degrees). The total number of the N-poles and the S-poles within the rotational angular range of 45 degrees of the rotary magnet 47 is 6 poles.

Figure 7A:
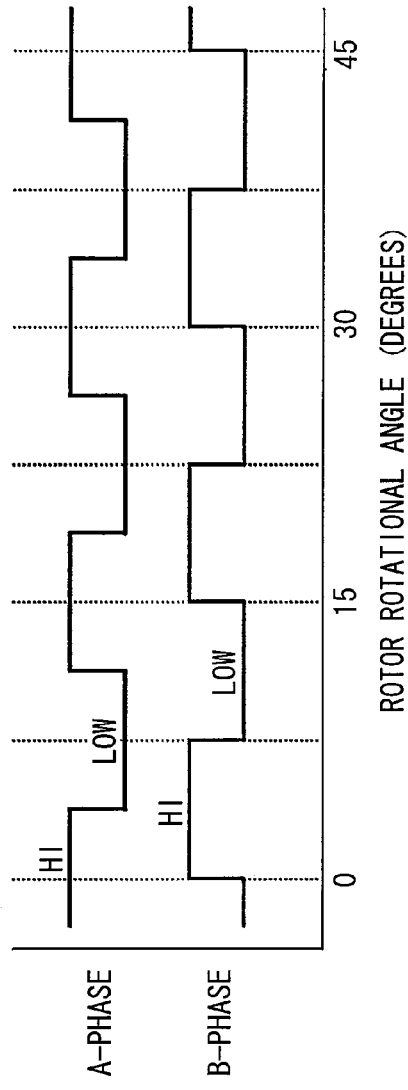
FIG. 7A is a time chart illustrating an output waveform of the encoder of the first embodiment.

The two magnetic sensing elements 48, 49 are arranged to have the following relationship relative to the rotary magnet 47. The magnetic sensing element 48, which outputs an A-phase signal, and the magnetic sensing element 49, which outputs a B-phase signal, are placed on the same circumference line such that these two magnetic sensing elements 48, 49 can oppose each of the magnetizing portions (N, S) of the rotary magnet 47 upon rotation of the rotary magnet 47. An interval between the magnetic sensing element 48 and the magnetic sensing element 49 is set such that an electrical angle of a phase difference between the A-phase signal and the B-phase signal is 90 degrees (a mechanical angle of 3.75 degrees) as shown in FIG. 7A. Here, the electrical angle is an angle defined in a case where one signal generation period of the A-phase signal and of the B-shape signal is set to 360 degrees. The mechanical angle is an angle defined in a case where one rotation of the rotor 32 is set to 360 degrees. The rotational angle of the rotor 32 from the falling edge (or the rising edge) of the A-phase signal to the falling edge (or the rising edge) of the B-phase signal corresponds to the mechanical angle of the phase difference between the A-phase signal and the B-phase signal.

The output of each of the magnetic sensing elements 48, 49 becomes the high (Hi) level when the magnetic sensing element 48, 49 is opposed to the N-pole, and the output of each of the magnetic sensing elements 48, 49 becomes the low (Low) level when the magnetic sensing element 48, 49 is opposed to the S-pole.

The ECU 41 (counter 41a) counts the A-phase signal and the B-phase signal, more specifically, counts the rising edges and falling edges of the A-phase signal and the rising edges and falling edges of the B-phase signal using the encoder 46. The ECU 41 sequentially changes the exciting phase(s) of the motor 12 based on the count value of the encoder 46 to rotate the rotor 32. At this time, the rotational direction of the rotor 32 of the motor 12 is determined based on the generating order of the A-phase and B-phase signals (i.e., based on which one of the A-phase signal and the B-phase signal is generated first). In the case of the normal rotation (i.e., the rotation in the rotational direction of the P-range to the Non-P-range), the encoder count value is counted up. On the other hand, in the case of the reverse rotation (i.e., the rotation in the rotational direction of the Non-P-range to the P-range), the encoder count value is counted down.

In this way, even when the rotor 32 is rotated in any one of the normal rotational direction and the reverse rotational direction, the relationship between the encoder count value and the rotational position of the rotor 32 is maintained. Thus, even when the rotor 32 is rotated in any one of the normal rotational direction and the reverse rotational direction, the rotational position (the rotational angle) of the rotor 32 can be sensed based on the encoder count value. Then, based on the sensed rotational position of the rotor 32, the windings 33, 34, which correspond to the sensed rotational position of the rotor 32, are energized to rotate the rotor 32.

Figure 7B:
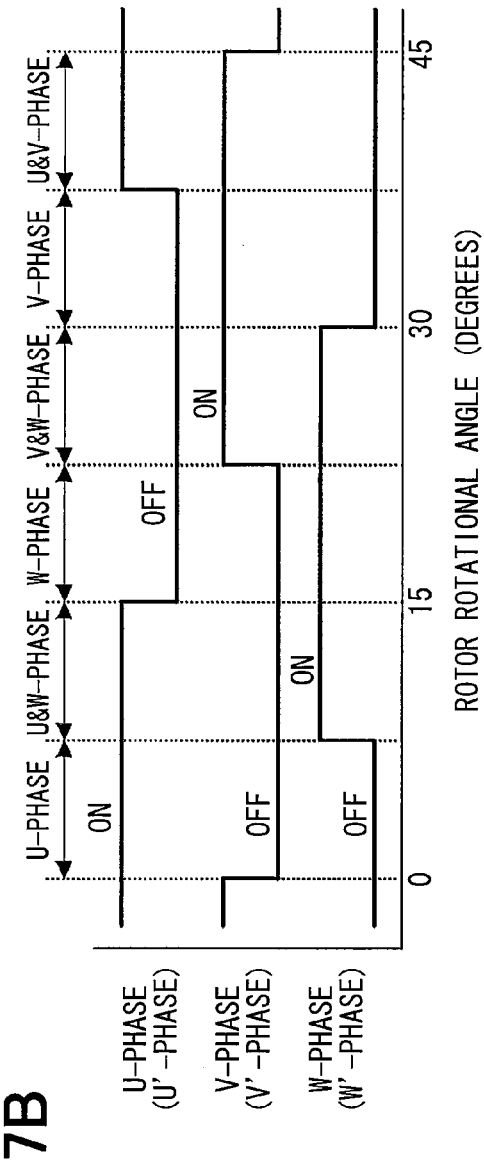
FIG. 7B is a time chart illustrating a change pattern of exciting phase(s) of the motor according to the first embodiment.

FIGS. 7A and 7B show the output waveform of the encoder 46 and the change pattern of the exciting phase(s) of the SR motor 12, respectively, at the time of rotating the rotor 32 in the reverse rotational direction (the rotational direction from the Non-P-range to the P-range). Zero-standard in the horizontal axis is different between FIG. 7A and FIG. 7B. The switching timing of the exciting phase(s) is varied based on, for example, the rotation speed of the rotor 32.

In any of the reverse rotational direction (the rotational direction from the Non-P-range to the P-range) and the normal rotational direction (the rotational direction from the P-range to the Non-P-range), every time when the rotor 32 is rotated by 7.5 degrees, switching between the 1-phase excitation and the 2-phase excitation takes place. For example, when the rotor 32 is rotated by 45 degrees, the exciting phase (s) is changed through one complete cycle in the order of the U-phase excitation, the U and W-phase excitation, the W-phase excitation, the V and W—phase excitation, the V-phase excitation, and the U and V-phase excitation.

Every time when the exciting phase(s) is changed, the rotor 32 is rotated by 7.5 degrees. Therefore, the magnetic pole of the rotary magnet 47, which is opposed the corresponding one of the magnetic sensing elements 48, 49 that output the A-phase signal and the B-phase signal, respectively, is changed from the N-pole to the S-pole, or the S-pole to the N-pole. Thereby, the level of the A-phase single and the level of the B-phase signal are alternately reversed. As a result, every time when the rotor 32 is rotated by 7.5 degrees, the encoder count value is counted up (or counted down) by 2.

The encoder count value is stored in the RAM of the ECU 41. Therefore, when the electric power source of the ECU 41 is turned off, the stored encoder count value is lost. Therefore, the encoder count value (0) right after the turning on of the electric power source of the ECU 41 may not correspond to the actual rotational position (exciting phase) of the rotor 32. Thus, in order to change the exciting phase(s) in conformity with the encoder count value, an initial position learning process is required to learn the relationship between the encoder count value and the exciting phase(s) upon coinciding between the encoder count value and the actual rotational position of the rotor 32 after turning on of the electric power source.

Because of the above need, in the first embodiment, the ECU 41 of the range change control apparatus 42 executes an initial drive operation routine. Thus, in the initial drive operation period after the turning on of the electric power source of the ECU 41, the exciting phase(s) of the motor 12 is sequentially changed through one complete cycle at a predetermined time schedule using an open loop control. At this time, the edges of the A-phase signal and the edges of the B-phase signal are both counted. Then, the relationship among the encoder count value, the rotational position of the rotor 32 and the exciting phase(s) at the end of the initial drive operation is learned. Thereafter, during the normal drive operation, each corresponding exciting phase is determined based on the encoder count value and the result of the learning at the end of the initial drive operation.

Figure 8:
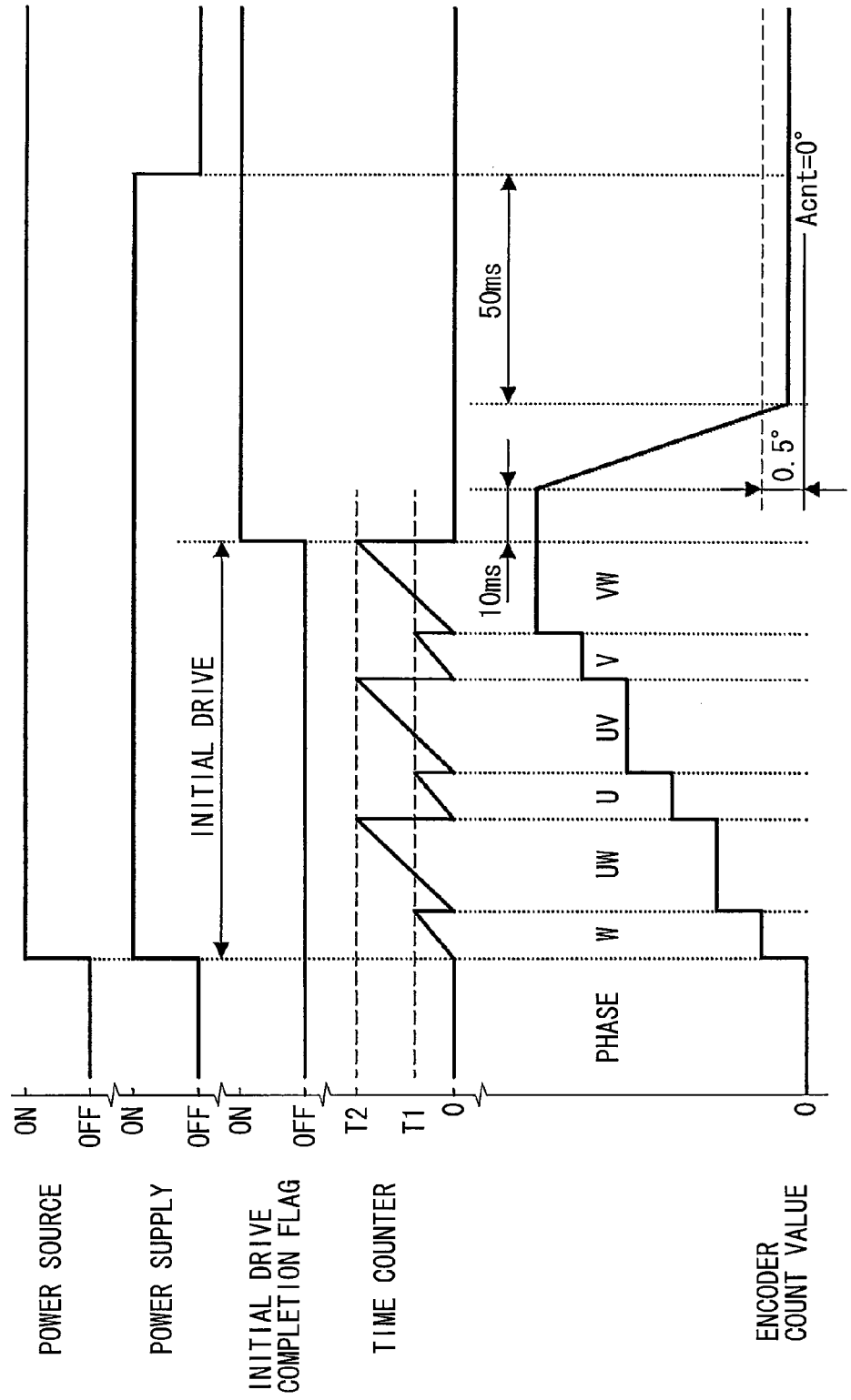
FIG. 8 is a time chart illustrating an example of a P-range initial drive operation routine according to the first embodiment.

The initial position learning process in the initial drive operation is performed as follows. As shown in FIG. 8, in the case where the initial drive operation is started after the turning on of the electric power source of the ECU 41 at the P-range, the exciting phase(s) is sequentially changed through one complete cycle at the predetermined time schedule in the order of the W-phase excitation, the U and W-phase excitation, the U-phase excitation, the U and V-phase excitation, the V-phase excitation, and the V and W-phase excitation, so that the rotor 32 is rotated in the normal rotational direction (the rotational direction of the P-range to the Non-P-range).

In contrast, in the case where the initial drive operation is started after the turning on of the electric power source of the ECU 41 at the Non-P-range, the exciting phase(s) is sequentially changed through one complete cycle at the predetermined time schedule in the order of V-phase excitation, the U and V-phase excitation, the U-phase excitation, the U and W-phase excitation, the W-phase excitation, and the V and W-phase excitation, so that the rotor 32 is rotated in the reverse rotational direction (the rotational direction of the Non-P-range to the P-range).

In this initial drive operation period, a time period T1 of each 1-phase excitation is set to be shorter than a time period T2 of each 2-phase excitation (e.g., T1=10 ms and T2=100 ms). Even in the case where the rotational position of the rotor 32 and the corresponding exciting phase(s) are synchronized with each other during the initial drive operation, the rotor 32 tends to vibrate during each 1 phase excitation where the generated torque is relatively small. In view of this, the time period T1 of each 1 phase excitation is shortened to immediately shift to the following 2 phase excitation. In this way, the vibrations of the rotor 32 are rapidly damped to stabilize the output signal of the encoder 46.

As discussed above, when the exciting phase is sequentially changed during the initial drive operation, the rotational position of the rotor 32 and the corresponding exciting phase(s) are coincided with each other at some exciting phase(s). Thereafter, the rotor 32 is rotated synchronously with the exciting phase change process, and the A-phase signal and the B-phase signal are outputted from the encoder 46 synchronously with the rotation of the rotor 32.

During the initial drive operation, the rising edges and falling edges of the A-phase signal and of the B-phase signal are counted. Therefore, by checking the encoder count value at the end of the initial drive operation, the actual rotational angle (the actual rotational amount) of the rotor 32, which is rotated synchronously with the progress of the exciting phase change process, can be identified. Further, the switching number of the exciting phase(s) before the rotor 32 actually rotates in synchronization with the switching of the exciting phase(s) can be identified. That is, a deviation amount of the exciting phase(s) with respect to the encoder count value can be identified based on the switching number. Thus, a correction value is calculated to correct the deviation amount with respect to the encoder count value, and the correction value can be learned.

In the exemplary case of FIG. 8, in the initial drive operation, the rotor 32 is rotated starting from the initial exciting phase (the W-phase). Furthermore, every time when the exciting phase(s) is changed, the rotor 32 is rotated by 7.5 degrees, and the encoder count value is counted up by 2. Therefore, at the end of the initial drive operation, the encoder count value becomes 12.

In contrast, in a case where the rotor 32 is not rotated in the initial three excitations (the W-phase excitation, the U and W-phase excitation, and the U-phase excitation in this order), i.e., in a case where the rotational position of the rotor 32 and the corresponding exciting phase(s) are synchronized at and after the fourth excitation (the U and V-phase excitation, the V-phase excitation, and the V and W-phase excitation) to cause rotation of the rotor 32 by the amount corresponding to the three excitations, the rotor 32 is rotated by 22.5 degrees (i.e., 7.5 degrees×3=22.5 degrees). Thus, the encoder count value becomes 6 (i.e., 2×3=6). Thereby, by checking the encoder count value at the end of the initial drive operation, it is possible to identify the actual rotational angle (the actual rotational amount) of the rotor 32, which is rotated synchronously with the sequential change of the exciting phase(s) until the end of the initial drive operation.

In the last excitation during the initial drive operation, the V and W phases are excited as the last exciting phases. However, the last encoder count value is not necessary 12. That is, in some cases, the last encoder count value may be, for example, 8 or 4 based on the deviation amount of the exciting phase(s). During the normal drive operation after the initial drive operation, each corresponding exciting phase is determined based on the encoder count value. Thus, if the deviation of the encoder count value is corrected in the initial drive operation, the correct exciting phase(s) can be selected during the normal drive operation.

Thereby, the encoder count value at the end of the initial drive operation is learned as an initial position deviation learning value. Thereafter, the encoder count value is corrected by the initial position deviation learning value during the normal drive operation. In this way, the deviation between the encoder count value and the corresponding exciting phase(s) (the corresponding rotational position of the rotor 32) is corrected, and thereby the correct exciting phase(s) can be selected during the normal drive operation.

In the exemplary case of FIG. 8, in the case where the rotor 32 is rotated from the initial exciting phase (the W-phase) at the initial drive time, that is in the case where the rotor 32 is rotated in synchronization with the switching in the exciting phase(s) from the start of the initial drive time, the encoder count value becomes 12 at the end of the initial drive operation. If the encoder count value is 8 at the end of the initial drive operation, the correction value is calculated as 4 (12−8=4). In other words, the correction value is calculated by subtracting the encoder count value at the end of the initial drive operation from 12.

The ECU 41 executes the initial drive learning process in which the correction value is calculated and learned in the initial drive operation.

After the initial drive operation, as shown in FIG. 8, the electric current is supplied for, for example, 10 ms to the same phases, which are the same as the last exciting phases, i.e., the V and W-phases at the end of the initial drive operation, to hold the rotor 32 at the last position of the rotor 32 at the end of the initial drive operation. Thereafter, the exciting phase is changed through feedback control based on the encoder count value and the initial position deviation learning value obtained at that time point, so that the rotor 32 is rotated in the direction toward a target position Acnt. In this way, when the rotational position (the encoder count value) of the rotor 32 reaches a range within, for example, 0.5 degrees from the target position Acnt, the sequential change of the exciting phase(s) is terminated to stop the rotor 32. Thereafter, the electric current is kept supplied to the same phase(s) to maintain the stop state of the rotor 32. For example, this state may be maintained for 50 ms. Thereafter, when the target position Acnt does not change, the supply of the electric current to the phase(s) is terminated.

Because the initial drive learning process is executed immediately after energized, the timing of the initial drive learning process overlaps with a cranking of an engine 71 (see FIG. 4) of the vehicle. If much current flows through an electric load such as a starter 72 (see FIG. 4) from the battery 50 because the starter 72 requires a large consumption electricity in the initial drive learning process, a voltage supplied to the motor 12 from the battery 50 may have a large lowering, and the initial drive learning process may be failed (ended with error such as erroneous learning). If the initial drive learning process is failed, in the normal drive operation after the initial drive operation, a deviation between the encoder count value and the rotational position of the rotor 32 (exciting phase) cannot be corrected. In this case, the motor 12 may not be driven normally.

In view of the above matter, a voltage detector such as sensor is provided to detect a voltage of the battery 50. The voltage supplied to the motor 12 from the battery 50 is monitored by the voltage detector which may be equipped in the ECU 41. For example, the ECU 41 executes the programs shown in FIGS. 9 and 10 to detect the voltage and success/failure of the initial drive learning process, so as to work as the voltage detector. The ECU 41 re-executes the initial drive learning process after the voltage becomes stable, when it is determined that a variation in the voltage is larger than a predetermined value and when the initial drive learning process is failed (ended with error such as erroneous learning) in that determination period.

In order to determine the failure of the initial drive learning process, the rotor 32 is driven in the 1-2 phase excitation mode in the initial drive operation and is stopped to terminate the initial drive operation at the position where the two phases are excited. When the pattern of the A-phase signal and the B-phase signal of the encoder 46 at the end of the initial drive operation does not match the pattern, which should be made at the time of exciting the two phases, it is determined that the result of the learning is incorrect (erroneous).

Specifically, as shown in FIG. 8, when the rotor 32 is rotated normally in the initial drive operation and is stopped to terminate the initial drive operation at the position where the two phases are excited (i.e., where the two phase excitation is executed), both of the A-phase signal and the B-phase signal of the encoder 46 show the high (Hi) level at the end of the initial drive operation (at the learning timing) regardless of whether the two phase excitation, which is executed at the end of the initial drive operation, is of the U and W-phase excitation, the U and V-phase excitation, and the V and W-phase excitation.

However, when the rotor 32 is rotated abnormally due to the allocation of the load to the rotor 32, one or both of the A-phase signal and the B-phase signal of the encoder 46 would show the low (Low) level at the end of the initial drive operation (at the learning timing). Because of the above relationship, according to the first embodiment, if both of the A-phase signal and the B-phase signal of the encoder 46 show the high (Hi) level at the end of the initial drive operation (at the learning timing), it is determined that the result of the learning is correct. In contrast, if one or both of the A-phase signal and the B-phase signal of the encoder 46 show the low (Low) level at the end of the initial drive operation (at the learning timing), it is determined that the result of the learning is incorrect (erroneous learning).

The programs executed by the ECU 41 will be described with reference to FIGS. 9 and 10.

Figure 9:
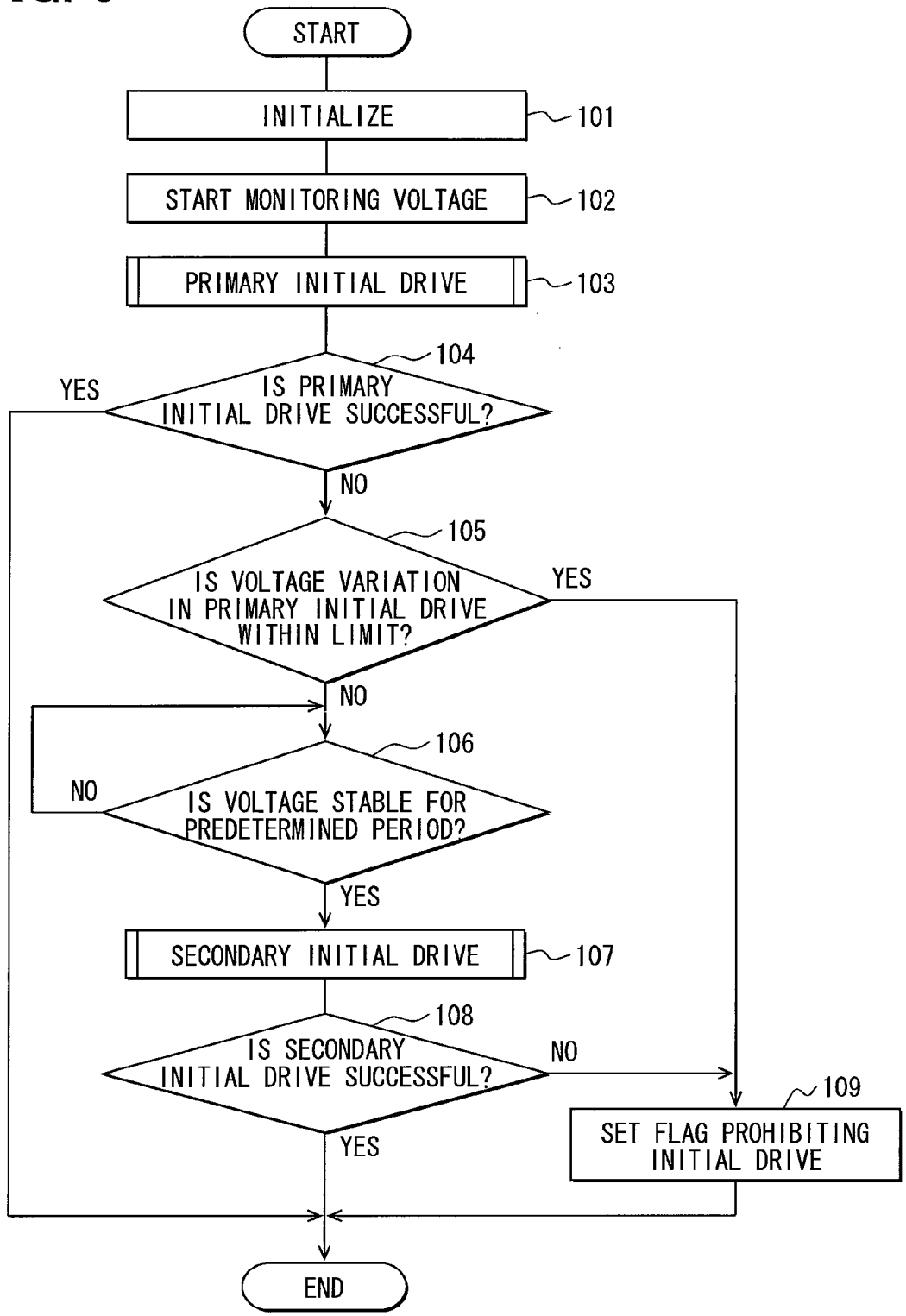
FIG. 9 is a flowchart illustrating a routine monitoring an initial drive operation according to the first embodiment.

A program monitoring the execution state of the initial drive operation shown in FIG. 9 is executed by the ECU 41 (learning portion 41b) right after the turning on of the ECU 41.

When the program of FIG. 9 is started, an initializing is conducted, and a flag prohibiting the initial drive operation is set OFF, at 101, so the initial drive operation is allowed to be conducted.

At 102, the monitoring of the voltage supplied to the motor 12 is started.

Figure 10:
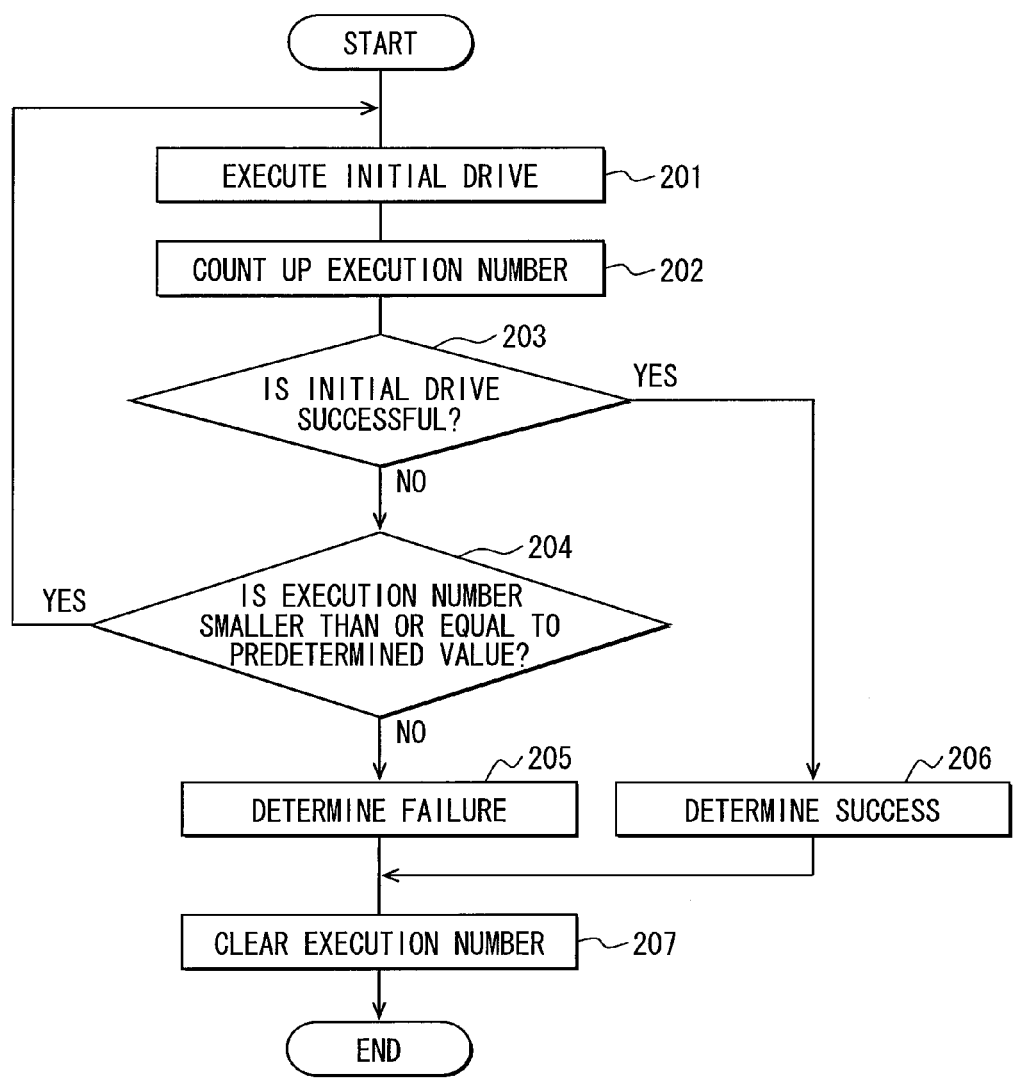
FIG. 10 is a flowchart illustrating a routine of the initial drive operation according to the first embodiment.

At 103, an initial drive execution program shown in FIG. 10 is conducted, and a first time (primary) initial drive operation is performed to learn the correction value. Thereafter, at 104, it is determined whether the first time initial drive operation is succeeded based on the result of the program shown in FIG. 10. If the first time initial drive operation is succeeded, the program of FIG. 9 is ended.

If the first time initial drive operation is determined to be failed at 104, it is determined whether a variation amount in the voltage supplied to the motor 12 in the primary initial drive operation is within a limit, at 105.

If it is determined that the variation amount in the voltage is within the limit at 105, the flag prohibiting the initial drive operation is set ON, at 109, to prohibit the initial drive operation, because the initial drive operation is failed while the voltage is stable. At this time, it is determined that the drive system of the motor 12 has an abnormality such as breakdown of the encoder 46 or the motor 12.

If it is determined that the variation amount in the voltage exceeds the limit at 105, it is determined that the voltage is unstable and the ECU 41 proceeds to 106. At 106, the ECU 41 waits until a predetermined time period is elapsed after the voltage becomes stable. If the predetermined time period is elapsed after the voltage becomes stable at 106, the ECU 41 proceeds to 107. At 107, the initial drive execution program shown in FIG. 10 is conducted again as a secondary initial drive operation to learn the correction value.

Thereafter, the ECU 41 proceeds to 108. At 108, it is determined whether the secondary initial drive operation is succeeded based on the result of the program shown in FIG. 10. If the secondary initial drive operation is succeeded, the program of FIG. 9 is ended.

If the secondary initial drive operation is determined to be failed at 108, the flag prohibiting the initial drive operation is set ON, at 109, to prohibit the initial drive operation. If the initial drive operation is failed even when the secondary initial drive operation is conducted predetermined (plural) times, the initial drive operation is prohibited, because it is determined that the drive system of the motor 12 has an abnormality such as breakdown of the encoder 46 or the motor 12.

The initial drive execution program shown in FIG. 10 is a subroutine executed at 103 and 107 of FIG. 9. When the initial drive execution program shown in FIG. 10 is activated, an initial drive operation is executed at 201 to learn the correction value. Then, at 202, the execution number of the initial drive operation is counted up. At 203, it is determined whether the initial drive operation is succeeded or failed. If it is determined that the initial drive operation is succeeded at 203, the initial drive operation is determined as success at 206, and the count value is cleared to zero at 207 to finish the program of FIG. 10.

If it is determined that the initial drive operation is failed at 203, the ECU 41 proceeds to 204, and determines whether the execution number of the initial drive operation counted at 202 is smaller than or equal to a predetermined number such as once or more, at 204. If it is determined that the execution number of the initial drive operation is smaller than or equal to the predetermined number, the ECU 41 returns to 201 to re-execute the initial drive operation.

Thereafter, if it is determined that the execution number of the initial drive operation is larger than the predetermined number at 204 without success in the initial drive operation, the ECU 41 proceeds to 205. At 205, it is determined that the initial drive operation is failed, and the count value is cleared to zero at 207 to finish the program of FIG. 10.

In this case, when the initial drive operation is re-executed, the rotating direction of the rotor 32 may be set to be the same as the previous initial drive operation or may be set to be opposite from the previous initial drive operation. If the rotating direction of the rotor 32 is set to be opposite from the previous initial drive operation, in a case where it is difficult for the rotor 32 to rotate in the previous direction due to a foreign object or external load, the rotor 32 may become to normally rotate. Thus, the probability that the initial drive operation is succeeded is raised.

According to the first embodiment, the ECU 41 re-executes the initial drive learning process after the voltage becomes stable, when the voltage detector detects a variation in the voltage applied to the motor 12 is larger than or equal to the predetermined value and when the initial drive learning process is failed (ended with error such as erroneous learning) in that period during which the voltage has the variation. Therefore, if the initial drive operation is failed due to the unstable voltage, the initial drive operation is quickly re-executed after the voltage becomes stable, such that the correction value can be learned accurately to raise the reliability of the initial drive learning process.

Second Embodiment

Figure 11:
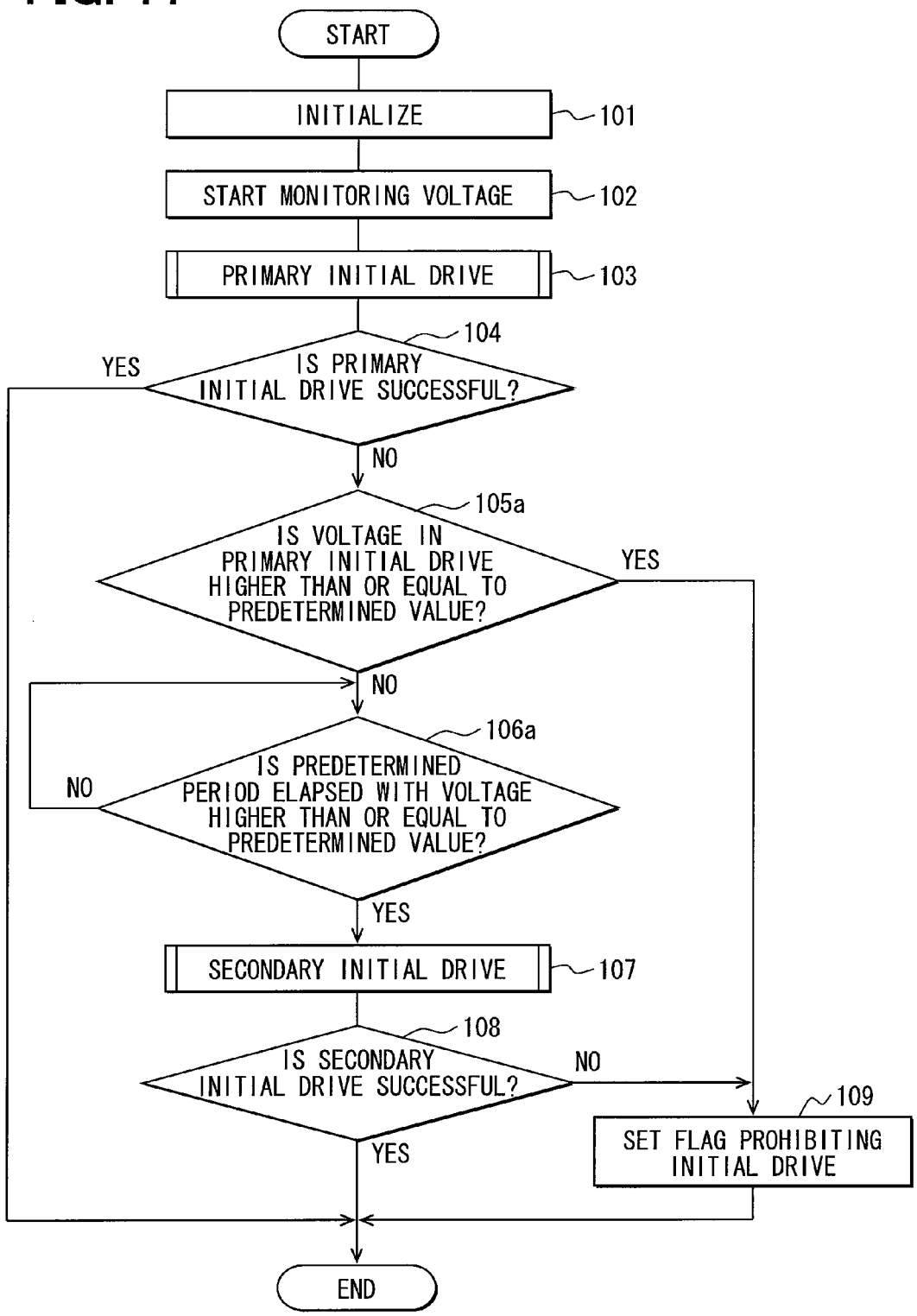
FIG. 11 is a flowchart illustrating a routine monitoring an initial drive operation according to a second embodiment.

In a second embodiment, the ECU 41 executes a program monitoring an initial drive execution state shown in FIG. 11. The program shown in FIG. 11, which is performed in the second embodiment, is different from the program shown in FIG. 9 only in that 105 and 106 in FIG. 9 are replaced by 105a and 106a. The other processes in FIG. 11 are the same as those in FIG. 9.

In the program shown in FIG. 11, the initializing is performed at 101, the monitoring of the voltage is started at 102, the primary initial drive operation is executed at 103, and it is determined whether the primary initial drive operation is successful at 104.

If it is determined that the primary initial drive operation is failed at 104, the ECU 41 progresses to 105a. At 105a, it is determined whether the voltage supplied to the motor 12 from the battery 50 is higher than or equal to a predetermined value during the primary initial drive operation. If it is determined that the voltage supplied to the motor 12 is higher than or equal to the predetermined value during the primary initial drive operation, it is determined that the initial drive operation is failed while a voltage necessary for executing the initial drive operation is secured, and the ECU 41 progresses to 109. At 109, the flag prohibiting the initial drive operation is set ON to prohibit an initial drive operation. That is, when the initial drive operation is failed in the state where a voltage necessary for executing the initial drive operation is secured, an initial drive operation is prohibited, because abnormalities may be occurred in the drive system of the motor 12 such as the encoder 46 or the motor 12.

If it is determined that the voltage supplied to the motor 12 becomes lower than the predetermined value in the primary initial drive operation at 105a, the ECU 41 progresses to 106a. At 106a, the ECU 41 waits for a moment at which a predetermined time period is elapsed in a state where the voltage supplied to the motor 12 is higher than or equal to the predetermined value (in a state where a voltage required for executing an initial drive operation is secured).

Thereafter, when the state where the voltage supplied to the motor 12 is higher than or equal to the predetermined value continues for the predetermined time period, the ECU 41 progresses to 107. At 107, the program of FIG. 10 is executed to perform the initial drive operation again as a secondary or subsequent initial drive operation. The other processes in FIG. 11 are the same as the first embodiment.

According to the second embodiment, the same advantage can be achieved as the first embodiment. Furthermore, in the second embodiment, the re-execution of the initial drive operation is postponed until the predetermined time period is elapsed in the state where the voltage supplied to the motor 12 is higher than or equal to the predetermined value, if it is determined that the voltage supplied to the motor 12 becomes lower than the predetermined value in the primary initial drive operation. Thus, the re-execution of the initial drive operation can be postponed until the voltage supplied to the motor 12 returns to the original stable state, if the voltage of the motor 12 falls greatly, for example, when large amount of electricity is supplied to the starter 72, which requires a large consumption electric current.

Third Embodiment

In a third embodiment, a current detector is provided such as sensor which monitors current flowing through an electric current such as the starter 72 from a power source such as the battery 50. The current detector may be included in the ECU 41 instead of providing the sensor. For example, the ECU 41 works as the current detector by executing a program monitoring an initial drive execution state shown in FIG. 12. The program shown in FIG. 12, which is performed in the third embodiment, is different from the program shown in FIG. 9 only in that 102, 105 and 106 in FIG. 9 are replaced by 102b, 105b and 106b. The other processes in FIG. 12 are the same as those in FIG. 9.

Figure 12:
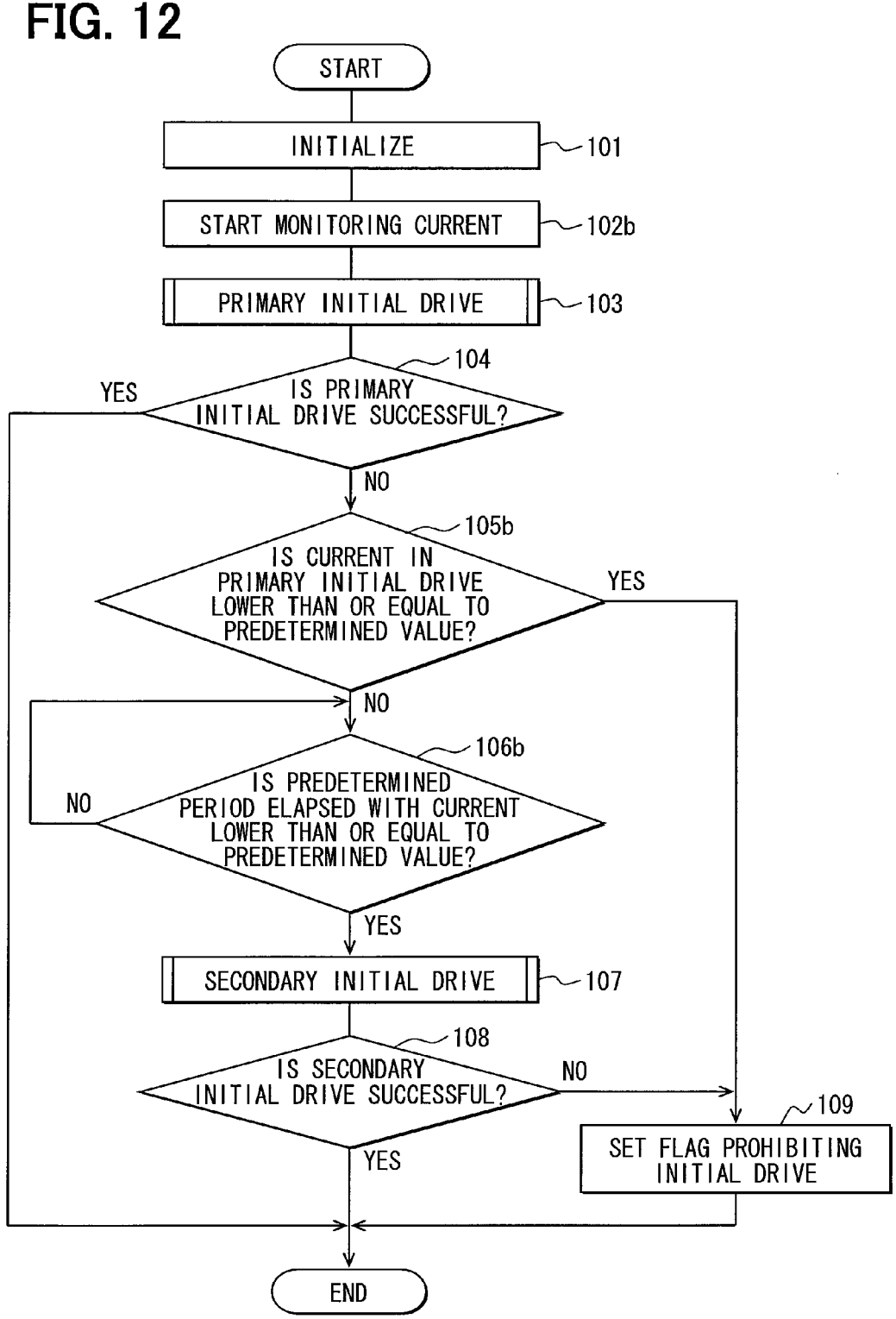
FIG. 12 is a flowchart illustrating a routine monitoring an initial drive operation according to a third embodiment.

In the program shown in FIG. 12, the initializing is conducted at 101, the monitoring of the current flowing through the starter 72 is started at 102b, and the primary initial drive operation is executed at 103 while the current continues to be monitored.

If it is determined that the primary initial drive operation is failed at 104, the ECU 41 progresses to 105b. At 105b, it is determined whether the current is lower than or equal to a predetermined value during the primary initial drive operation. If it is determined that the current is lower than or equal to the predetermined value during the primary initial drive operation, it is determined that the primary initial drive operation is failed while a lowering in the voltage of the battery 50, which is caused by the current, is relatively small, and the ECU 41 progresses to 109. At 109, the flag prohibiting the initial drive operation is set ON to prohibit an initial drive operation. That is, when the initial drive operation is failed in the state where a voltage necessary for executing the initial drive operation is secured, an initial drive operation is prohibited, because abnormalities may be occurred in the drive system of the motor 12 such as the encoder 46 or the motor 12.

If it is determined that the current becomes higher than the predetermined value in the primary initial drive operation at 105b, it is determined that the failure of the initial drive operation is caused by a lowering in the voltage of the battery 50 due to the current which becomes higher than the predetermined value, and the ECU 41 progresses to 106b. At 106b, the ECU 41 waits for a moment at which a predetermined time period is elapsed in a state where the current is lower than or equal to the predetermined value (in a state where a lowering in the voltage caused by the current is relatively small).

Thereafter, when the state where the current is lower than or equal to the predetermined value continues for the predetermined time period, it is determined that a voltage required for executing an initial drive operation is secured, and the ECU 41 progresses to 107. At 107, the program of FIG. 10 is executed to perform an initial drive operation again as a secondary or subsequent initial drive operation. The other processes in FIG. 12 are the same as the first embodiment.

According to the third embodiment, the same advantage can be achieved as the first embodiment. Furthermore, according to the third embodiment, when the initial drive operation is failed by a large lowering in the voltage due to the current exceeding the predetermined value in the primary initial drive operation, an initial drive operation is re-executed quickly when the voltage becomes stable after all the current finishes flowing through the starter 72, to accurately learn the correction value.

Fourth Embodiment

In a fourth embodiment, a detector is provided to monitor a state (ON/OFF) of the starter 72 used for starting the engine 71. The detector may be included in the ECU 41. For example, the ECU 41 works as the detector by executing a program monitoring the initial drive execution state shown in FIG. 13. The program shown in FIG. 13, which is performed in the fourth embodiment, is different from the program shown in FIG. 9 only in that 102, 105 and 106 in FIG. 9 are replaced by 102c, 105c and 106c. The other processes in FIG. 13 are the same as those in FIG. 9.

Figure 13:
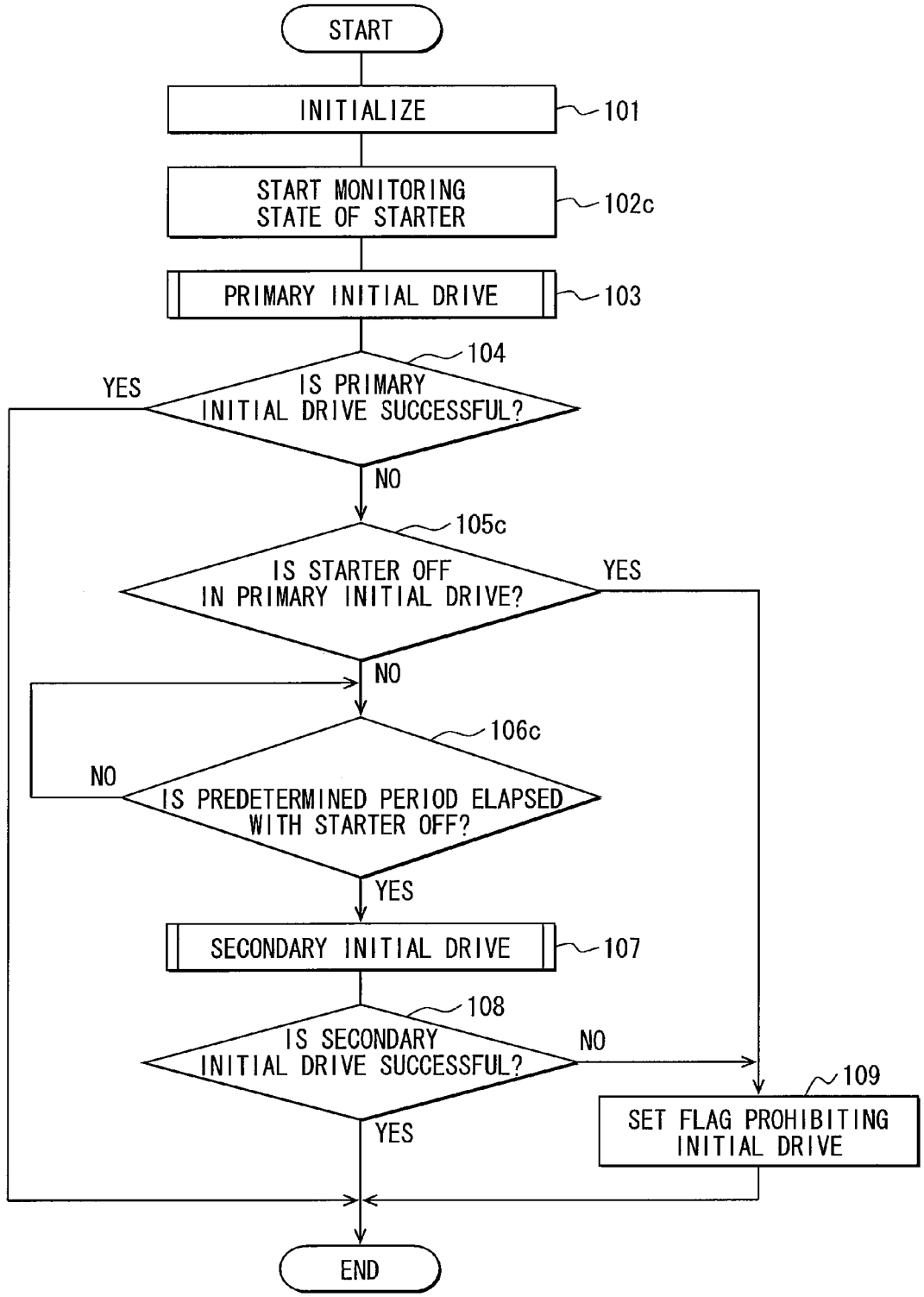
FIG. 13 is a flowchart illustrating a routine monitoring an initial drive operation according to a fourth embodiment.

In the program shown in FIG. 13, the initializing is conducted at 101, the monitoring of the state of the starter 72 is started at 102c, and the primary initial drive operation is executed at 103 while the state of the starter 72 continues to be monitored.

If it is determined that the primary initial drive operation is failed at 104, the ECU 41 progresses to 105c. At 105c, it is determined whether the starter 72 is OFF during the first initial drive. If it is determined that the starter 72 is OFF during the primary initial drive operation, it is determined that the primary initial drive operation is failed while there is no lowering in the voltage of the battery 50 which is caused by turning on the starter 72, and the ECU 41 progresses to 109. At 109, the flag prohibiting the initial drive operation is set ON to prohibit an initial drive operation. That is, when the initial drive operation is failed in the state where there is no lowering in the voltage of the battery 50 which is caused by turning on the starter 72, an initial drive operation is prohibited, because abnormalities may be occurred in the drive system of the motor 12 such as the encoder 46 or the motor 12.

If it is determined that the starter 72 is turned ON in the primary initial drive operation at 105c, the ECU 41 progresses to 106c. At 106c, the ECU 41 waits for a moment at which a predetermined time period is elapsed in a state where the starter 72 is OFF (in a state where there is no lowering in the voltage of the battery 50 which is caused by turning on the starter 72). Thereafter, when the state where the starter 72 is OFF continues for the predetermined time period, the ECU 41 progresses to 107. At 107, the program of FIG. 10 is executed again as a secondary or subsequent initial drive. The other processes in FIG. 13 are the same as the first embodiment.

According to the fourth embodiment, the same advantage can be achieved as the first embodiment. Furthermore, according to the fourth embodiment, when it is determined that a large lowering is generated in the voltage by turning on the starter 72 during the primary initial drive operation, the re-execution of the initial drive operation is postponed until the predetermined time period is elapsed in the state where the starter 72 is OFF. Thus, when the initial drive operation is failed by turning on the starter 72, the re-execution of the initial drive operation can be postponed until the voltage supplied to the motor 12 returns to the original stable state by turning off the starter 72, to correctly learn the correction value.

Fifth Embodiment

In a fifth embodiment, a detector is provided to monitor a presence of an engine start operation conducted by a driver of the vehicle. The ECU 41 may work as the detector by executing a program monitoring initial drive execution state shown in FIG. 14. Specifically, the detector detects a turning-on of the ignition switch 52 to detect an operation for starting the engine 71 by the driver. The program shown in FIG. 14, which is performed in the fifth embodiment, is different from the program shown in FIG. 9 only in that 102, 105 and 106 in FIG. 9 are replaced by 102d, 105d and 106d. The other processes in FIG. 14 are the same as those in FIG. 9.

Figure 14:
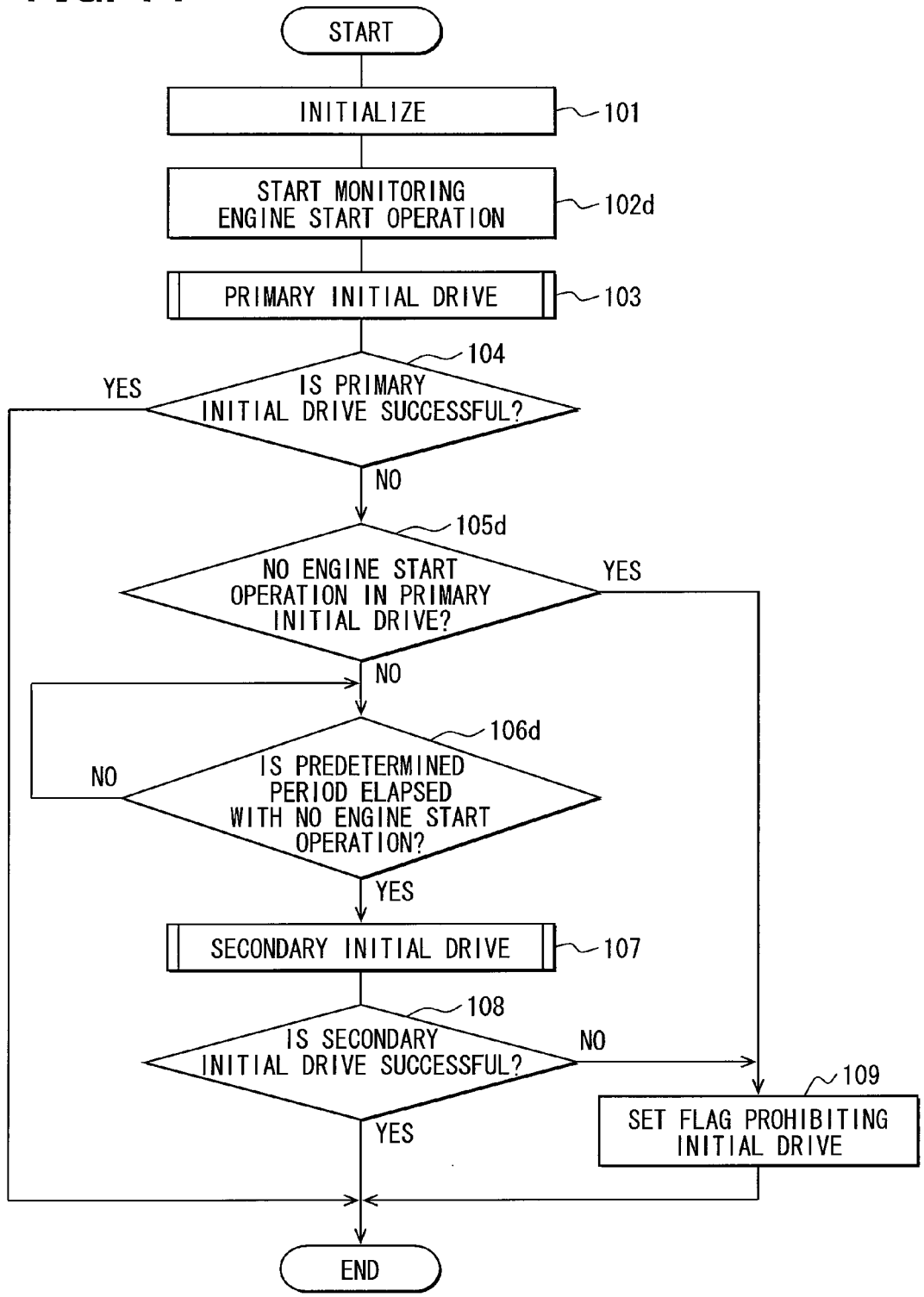
FIG. 14 is a flowchart illustrating a routine monitoring an initial drive operation according to a fifth embodiment.

In the program shown in FIG. 14, the initializing is conducted at 101, the monitoring of the engine start operation is started at 102d, and the primary initial drive operation is executed at 103 while the engine start operation continues to be monitored.

If it is determined that the primary initial drive operation is failed at 104, the ECU 41 progresses to 105d. At 105d, it is determined whether there is an engine start operation in the primary initial drive operation. If it is determined that there is no engine start operation during the primary initial drive operation, it is determined that the primary initial drive operation is failed while there is no lowering in the voltage of the battery 50 which is caused by turning on the starter 72, and the ECU 41 progresses to 109. At 109, the flag prohibiting the initial drive operation is set ON to prohibit an initial drive operation. That is, when the initial drive operation is failed in the state where there is no lowering in the voltage of the battery 50 which is caused by turning on the starter 72 triggered by the engine start operation, an initial drive operation is prohibited, because abnormalities may be occurred in the drive system of the motor 12 such as the encoder 46 or the motor 12.

If it is determined that there is an engine start operation in the primary initial drive operation at 105d, the ECU 41 progresses to 106d. At 106d, the ECU 41 waits for a moment at which a predetermined time period is elapsed in a state where there is no engine start operation (in a state where there is no lowering in the voltage of the battery 50 which is caused by turning on the starter 72), because it is considered that the starter 72 is kept ON until a speed of the engine 71 exceeds a determination value used for determining the end of the startup, even after the engine start operation is finished.

Thereafter, when the state where there is no engine start operation continues for the predetermined time period, the ECU 41 progresses to 107. At 107, the program of FIG. 10 is executed again as a secondary or subsequent initial drive operation. The other processes in FIG. 14 are the same as the first embodiment.

According to the fifth embodiment, the same advantage can be achieved as the first embodiment. Furthermore, according to the fifth embodiment, when it is determined that a large lowering is generated in the voltage by the engine start operation in the primary initial drive operation, the re-execution of the initial drive operation is postponed until the predetermined time period is elapsed in the state where there is no engine start operation. Thus, when the initial drive operation is failed by turning on the starter 72 due to the engine start operation, the re-execution of the initial drive operation can be postponed until the voltage supplied to the motor 12 returns to the original stable state by turning off the starter 72, to correctly learn the correction value.

Sixth Embodiment

In a sixth embodiment, a detector is provided to monitor a speed of the engine 71. The detector may be included in the ECU 41, which executes a program monitoring initial drive execution state shown in FIG. 15. The program shown in FIG.

15, which is performed in the sixth embodiment, is different from the program shown in FIG. 9 only in that 102, 105 and 106 in FIG. 9 are replaced by 102e, 105e and 106e. The other processes in FIG. 15 are the same as those in FIG. 9.

Figure 15:
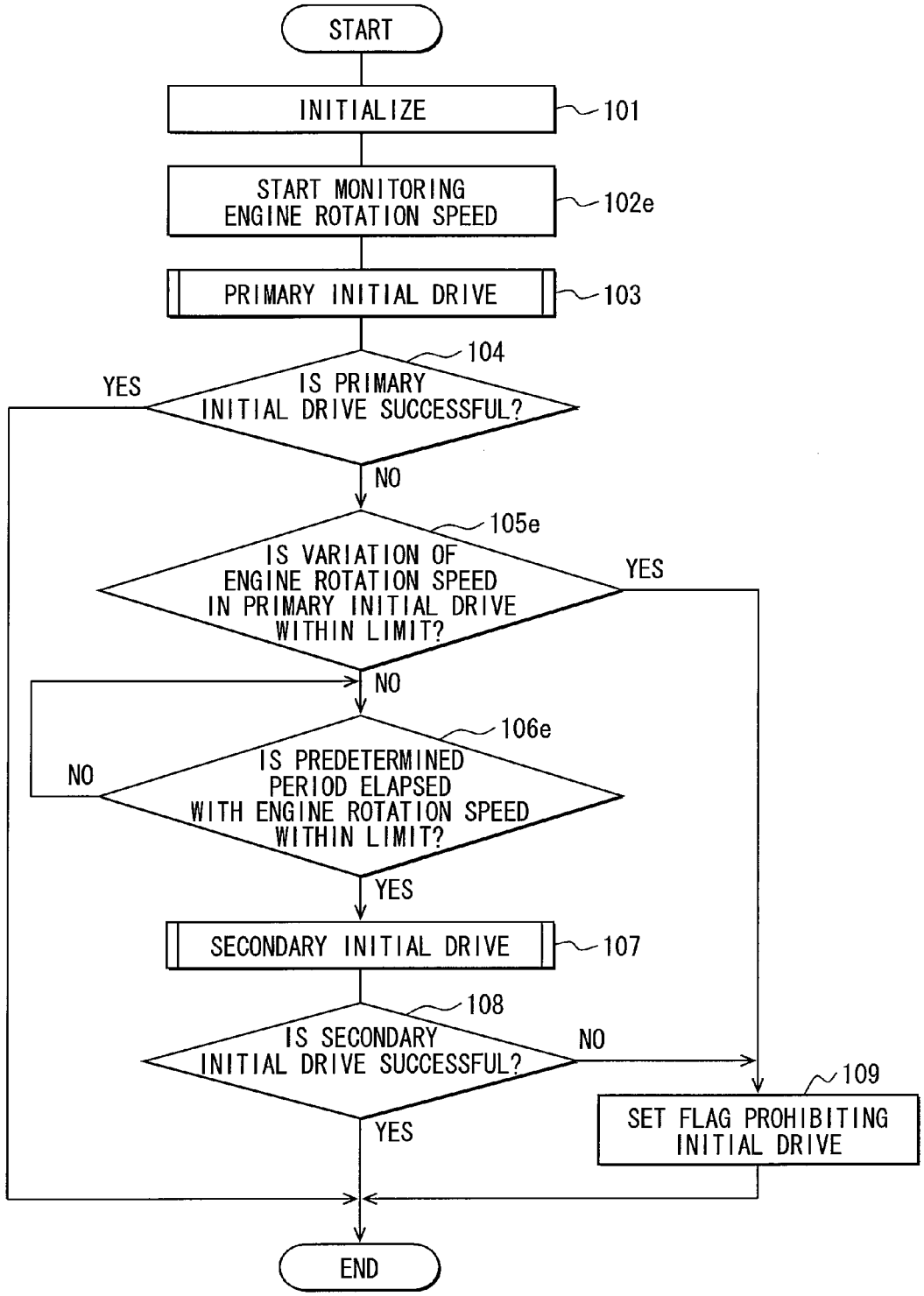
FIG. 15 is a flowchart illustrating a routine monitoring an initial drive operation according to a sixth embodiment.

In the program shown in FIG. 15, the initializing is conducted at 101, the monitoring of the speed of the engine 71 is started at 102e, and the primary initial drive operation is executed at 103 while the speed continues to be monitored.

If it is determined that the primary initial drive operation is failed at 104, the ECU 41 progresses to 105e. At 105e, it is determined whether a variation in the speed is within a limit during the initial drive operation. If it is determined that a variation in the speed is within the limit during the initial drive operation, it is determined that the initial drive operation is failed while the voltage of the battery 50 is stable because the variation in the speed is relatively small, and the ECU 41 progresses to 109. At 109, the flag prohibiting the initial drive operation is set ON to prohibit an initial drive operation. That is, when the initial drive operation is failed in the state where the voltage of the battery 50 is stable because the variation in the speed is relatively small, an initial drive operation is prohibited, because abnormalities may be occurred in the drive system of the motor 12 such as the encoder 46 or the motor 12.

If it is determined that a variation in the speed exceeds the limit in the initial drive operation at 105e, the ECU 41 progresses to 106e. At 106e, the ECU 41 waits for a moment at which a predetermined time period is elapsed in a state where a variation in the speed is within the limit.

Thereafter, when the state where a variation in the speed is within the limit continues for the predetermined time period, it is determined that the voltage is stable and the ECU 41 progresses to 107. At 107, the program of FIG. 10 is executed again as a secondary or subsequent initial drive operation. The other processes in FIG. 15 are the same as the first embodiment.

According to the sixth embodiment, the same advantage are achieved as the first embodiment. Furthermore, according to the sixth embodiment, when it is determined that a variation in the speed of the engine 71 exceeds the limit in the primary initial drive operation, the re-execution of the initial drive operation is postponed until the predetermined time period is elapsed in the state where a variation in the speed is within the limit.

Thus, for example, when the initial drive operation is failed while the speed of the engine 71 is increasing by turning on the starter 72, the re-execution of the initial drive operation can be postponed until the rotation number returns to the original stable state by turning off the starter 72 after the speed of the engine 71 exceeds a predetermined value, to correctly learn the correction value.

Seventh Embodiment

Figure 16:
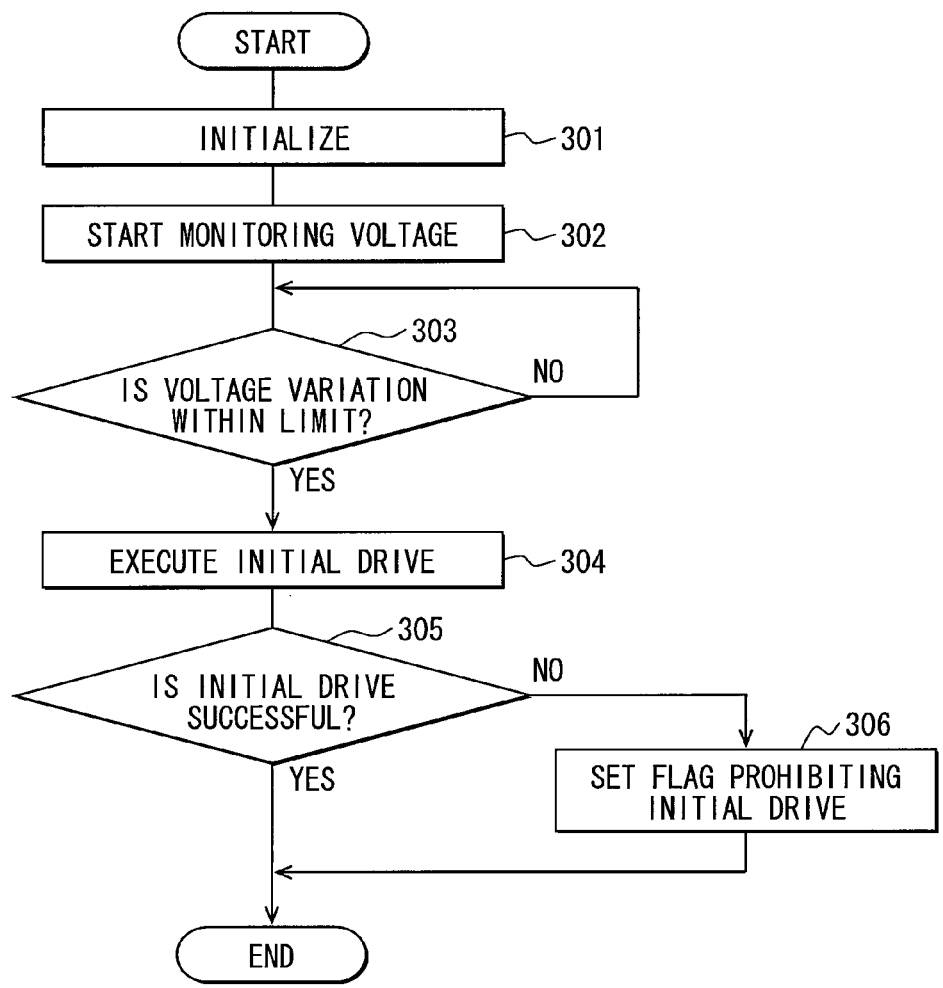
FIG. 16 is a flowchart illustrating a routine monitoring an initial drive operation according to a seventh embodiment.

In a seventh embodiment, a voltage detector such as sensor is provided to detect a voltage supplied to the motor 12 from the battery 50. The voltage detector may be equipped in the ECU 41. For example, the ECU 41 works as the voltage detector by executing a program of FIG. 16. The program shown in FIG. 16 is executed when the ECU 41 is energized (learning portion 41b). When the program is activated, an initializing is conducted and a flag prohibiting the initial drive operation is set off at 301, so the initial drive operation is allowed to be conducted. At 302, the monitoring of the voltage supplied to the motor 12 is started. At 303, it is determined whether a variation amount in the voltage supplied to the motor 12 is within a limit.

If it is determined that the variation amount in the voltage exceeds the limit at 303, it is determined that the voltage is unstable and the ECU 41 waits until the variation amount in the voltage becomes within the limit (or waits until a predetermined time period is elapsed in the state where the variation amount in the voltage is within the limit).

Then, when the variation amount in the voltage becomes within the limit (or when the predetermined time period is elapsed in the state where the variation amount in the voltage is within the limit), it is determined that the voltage is stable, and the ECU 41 progresses to 304. At 304, an initial drive operation is performed by the same method as the first embodiment to learn the correction value. Then, the ECU 41 progresses to 305, and determines whether the initial drive operation is succeeded. If it is determined that the initial drive operation is succeeded at 305, the program will be ended.

If it is determined that the initial drive operation is failed at 305, the ECU 41 progresses to 306, and sets the flag prohibiting the initial drive operation ON to prohibit the initial drive operation, and the program will be ended.

According to the seventh embodiment, the initial drive operation is prohibited until the voltage becomes stable, when it is determined that a variation in the voltage applied to the motor 12 is larger than or equal to a predetermined value. Therefore, if the state where the voltage is unstable continues before the initial drive operation is started after energized, the initial drive operation is not started. Then, after the voltage becomes stable, a first time initial drive operation is quickly executed to learn the correction value.

Eighth Embodiment

Figure 17:
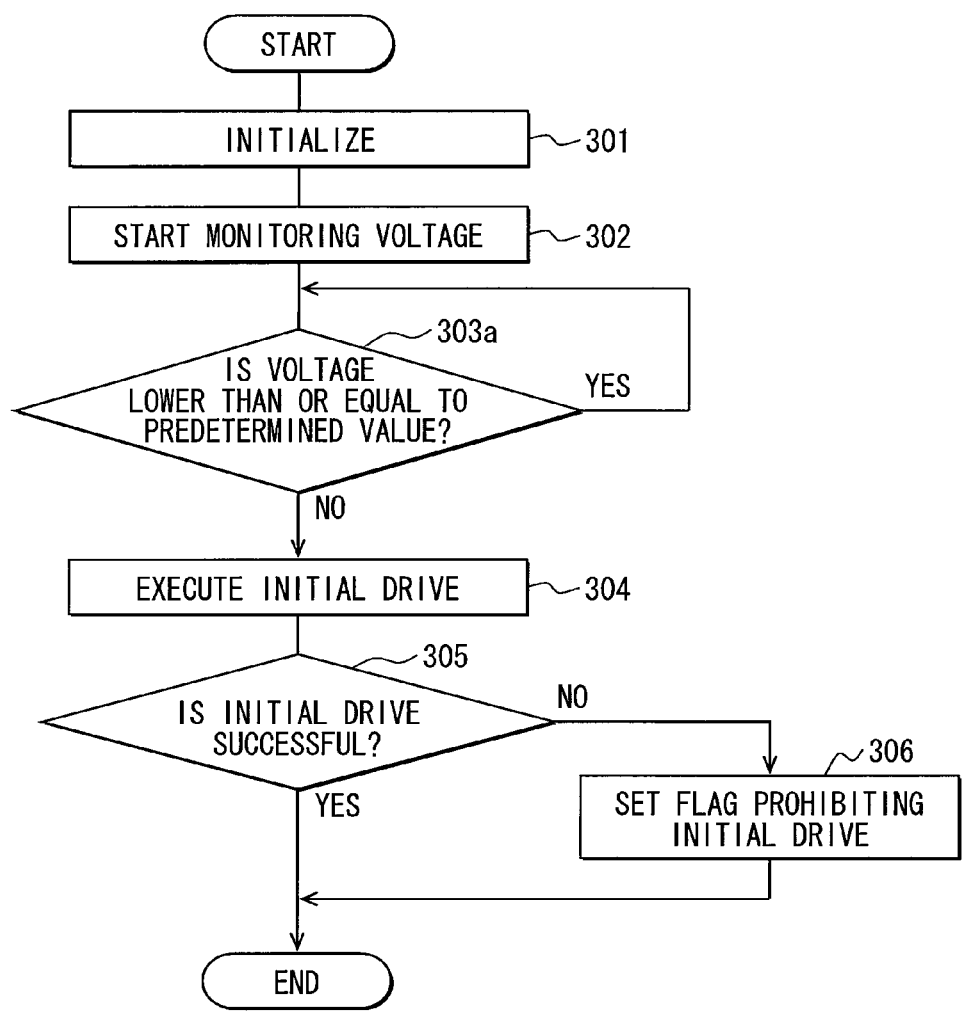
FIG. 17 is a flowchart illustrating a routine monitoring an initial drive operation according to an eighth embodiment.

In an eighth embodiment, the ECU 41 executes a program shown in FIG. 17. When the program is started, the flag prohibiting the initial drive operation is set OFF to allow an initial drive operation at 301.

Then, the ECU 41 progresses to 302, and the monitoring of the voltage supplied from the battery 50 to the motor 12 is started. At 303a, it is determined whether the voltage supplied to the motor 12 from the battery 50 is lower than or equal to a predetermined value. If it is determined that the voltage supplied to the motor 12 is lower than or equal to the predetermined value at 303a, it is determined that a voltage necessary for executing the initial drive operation is not secured, and the ECU 41 waits until the voltage exceeds the predetermined value (or waits until the state where the voltage exceeds the predetermined value continues for a predetermined time period).

Then, when the voltage exceeds the predetermined value (or when the state where the voltage exceeds the predetermined value continues for the predetermined time period), it is determined that the required voltage is secured, and the ECU 41 progresses to 304. At 304, an initial drive operation is performed by the same method as the first embodiment to learn the correction value. Then, the ECU 41 progresses to 305, and determines whether the initial drive operation is succeeded. If it is determined that the initial drive operation is succeeded at 305, the program will be ended. If it is determined that the initial drive operation is failed at 305, the ECU 41 progresses to 306, and sets the flag prohibiting the initial drive operation ON to prohibit an initial drive operation.

According to the eighth embodiment, the initial drive operation is prohibited until the voltage is raised higher than the predetermined value, when it is determined that the voltage supplied to the motor 12 is lower than or equal to the predetermined value. Thus, if the voltage of the motor 12 falls greatly, for example, when large amount of electricity is supplied to the starter 72, which requires a large consumption electric current, before the initial drive operation is started after energized, the initial drive learning process is not executed. Thereafter, the initial drive learning process is quickly executed after the voltage becomes stable to the original state, to learn the correction value correctly.

Ninth Embodiment

Figure 18:
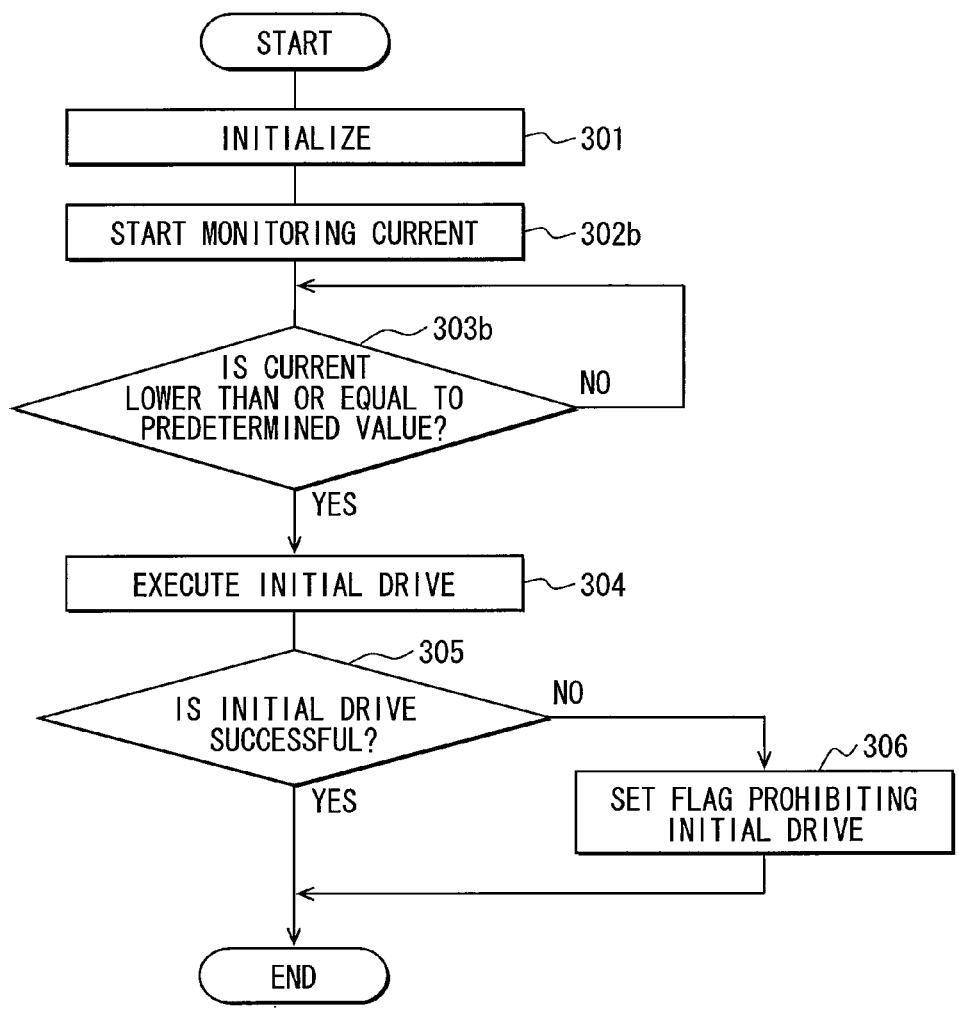
FIG. 18 is a flowchart illustrating a routine monitoring an initial drive operation according to a ninth embodiment.

In a ninth embodiment, a current detector is provided such as sensor which monitors current flowing through the starter 72 from a power source such as the battery 50. The current detector may be equipped in the ECU 41, and the ECU 41 executes a program shown in FIG. 18. When the program is started, the flag prohibiting the initial drive operation is set OFF to allow an initial drive operation at 301.

Then, the ECU 41 progresses to 302b, and the monitoring of the current is started. At 303b, it is determined whether the current is lower than or equal to a predetermined value. If it is determined that the current exceeds the predetermined value at 303b, it is determined that there is large lowering in the voltage and that a voltage necessary for executing the initial drive operation is not secured, and the ECU 41 waits until the current becomes lower than or equal to the predetermined value (or waits until the state where the current becomes lower than or equal to the predetermined value continues for a predetermined time period).

Then, when the current becomes lower than or equal to the predetermined value (or when the state where the current becomes lower than or equal to the predetermined value continues for the predetermined time period), it is determined that the required voltage is secured, and the ECU 41 progresses to 304. At 304, an initial drive operation is performed by the same method as the first embodiment to learn the correction value. Then, the ECU 41 progresses to 305, and determines whether the initial drive operation is succeeded. If it is determined that the initial drive operation is succeeded, the program will be ended. If it is determined that the initial drive operation is failed, the ECU 41 progresses to 306, and sets the flag prohibiting the initial drive operation ON to prohibit an initial drive operation.

According to the ninth embodiment, when it is determined that a large current higher than the predetermined value flows from the battery 50, the initial drive operation is prohibited until the all the current exceeding the predetermined value finishes flowing. Thus, if the voltage of the motor 12 falls greatly by the large current supplied to the starter 72, which requires a large consumption electric current, before the initial drive operation is started after energized, the initial drive learning process is not executed. Thereafter, a first time initial drive learning process is performed to learn the correction value quickly after the voltage becomes stable to the original state in response to the finish of the flowing of the large current.

Tenth Embodiment

Figure 19:
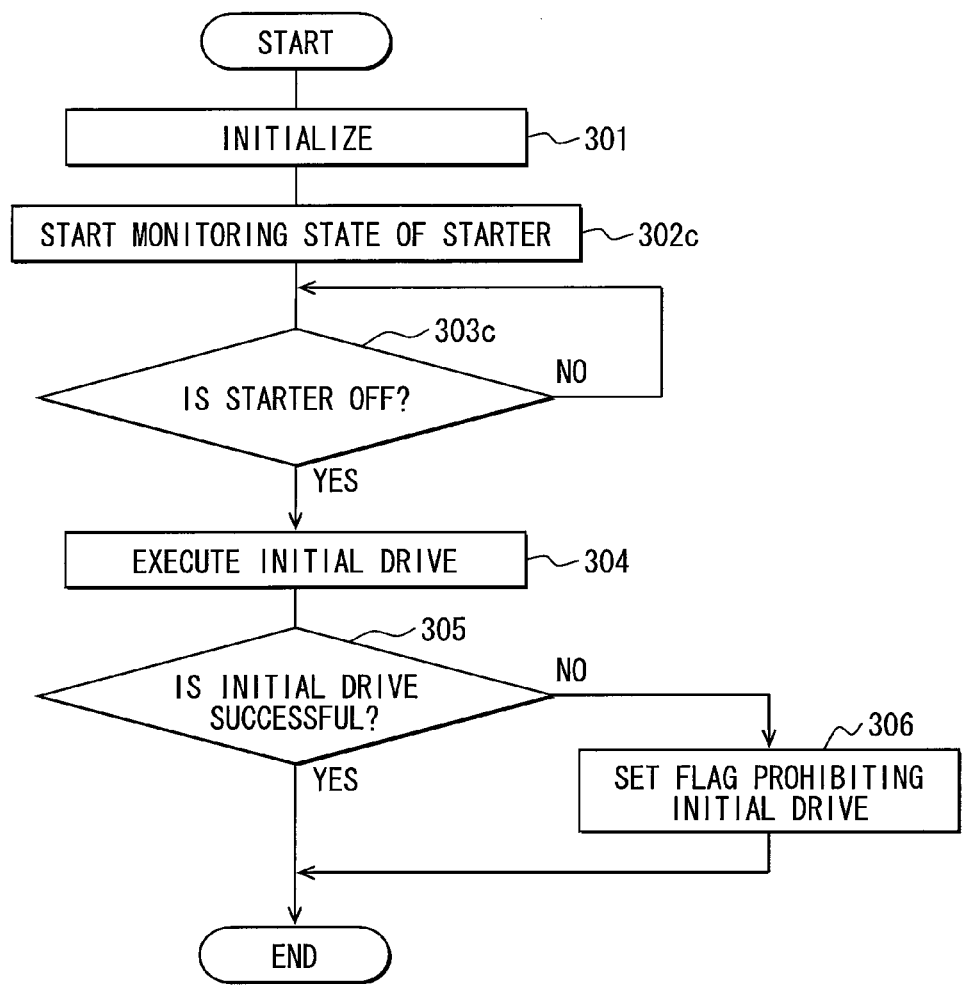
FIG. 19 is a flowchart illustrating a routine monitoring an initial drive operation according to a tenth embodiment.

In a tenth embodiment, a detector is provided to monitor a state (ON/OFF) of the starter 72 used for starting the engine 71. The detector may be equipped in the ECU 41, which executes a program shown in FIG. 19. When the program is started, the flag prohibiting the initial drive operation is set OFF to allow an initial drive operation at 301.

Then, the ECU 41 progresses to 302c, and the monitoring of the state of the starter 72 is started. At 303c, it is determined whether the starter 72 is OFF. If it is determined that the starter 72 is ON at 303c, it is determined that there is large lowering in the voltage and that a voltage necessary for executing the initial drive operation is not secured, and the ECU 41 waits until the starter 72 is turned OFF (or waits until the state where the starter 72 is turned OFF continues for a predetermined time period).

Then, when the starter 72 is turned OFF (or when the state where the starter 72 is turned OFF continues for the predetermined time period), it is determined that the required voltage is secured, and the ECU 41 progresses to 304. At 304, an initial drive operation is performed by the same method as the first embodiment to learn the correction value. Then, the ECU 41 progresses to 305, and determines whether the initial drive operation is succeeded. If it is determined that the initial drive operation is succeeded, the program will be ended. If it is determined that the initial drive operation is failed, the ECU progresses to 306, and sets the flag prohibiting the initial drive operation ON to prohibit an initial drive operation.

According to the tenth embodiment, the initial drive operation is prohibited until the starter 72 is turned OFF, when it is determined that the starter 72 is ON. Thus, if the voltage of the motor 12 falls greatly when the starter 72 is ON, which requires a large consumption electric current, before the initial drive operation is started after energized, the initial drive learning process is not executed. Thereafter, a first time initial drive learning process is performed to learn the correction value quickly after the voltage becomes stable to the original state in response to the turning OFF of the starter 72.

Eleventh Embodiment

Figure 20:
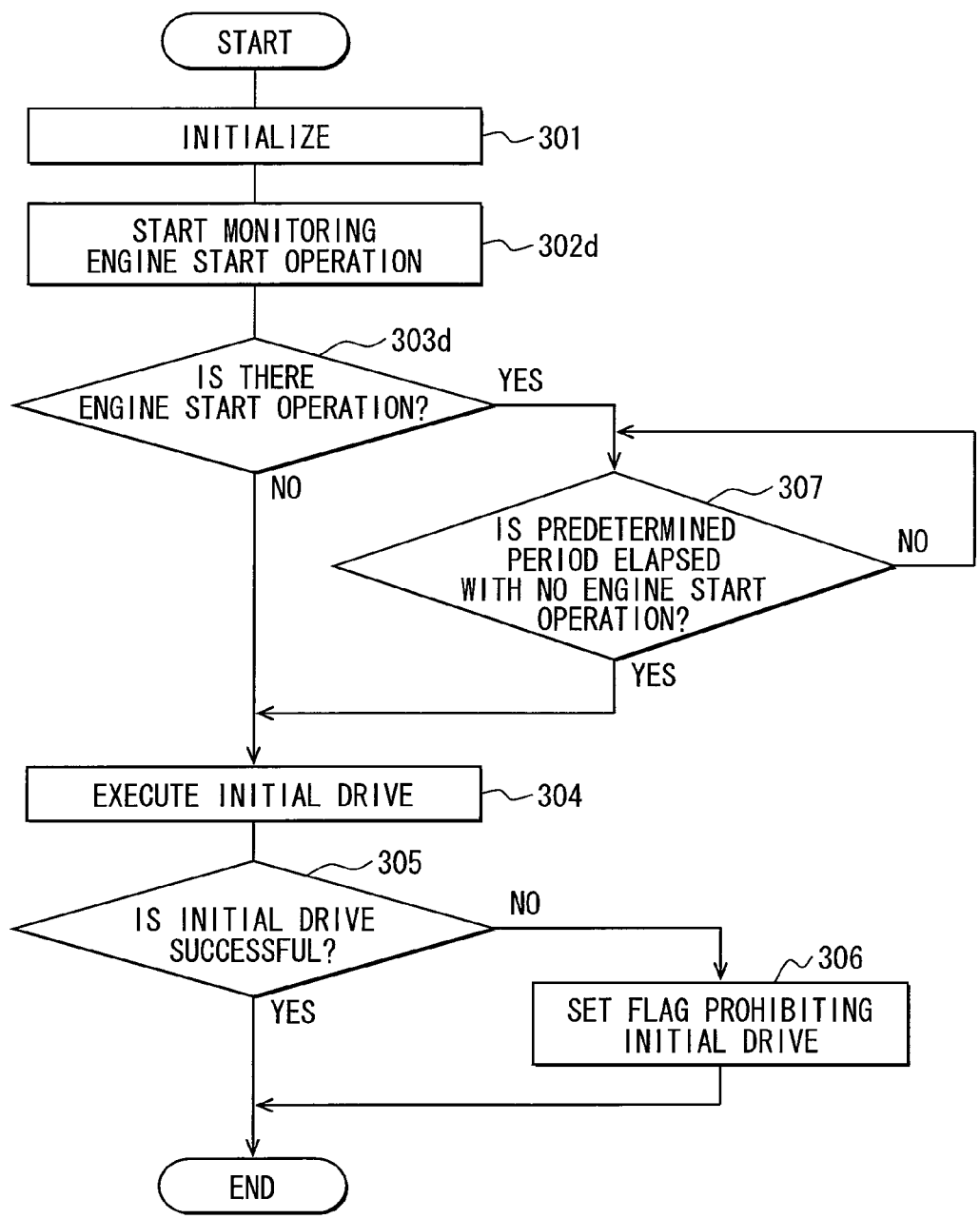
FIG. 20 is a flowchart illustrating a routine monitoring an initial drive operation according to an eleventh embodiment.

In an eleventh embodiment, a detector is provided to monitor a presence of an engine start operation (turning ON the ignition switch 52) conducted by a driver of the vehicle. The detector may be equipped in the ECU 41, which executes a program shown in FIG. 20. When the program is started, the flag prohibiting the initial drive operation is set OFF to allow an initial drive operation at 301.

Then, the ECU 41 progresses to 302d, and the monitoring of the engine start operation is started. At 303d, it is determined whether there is no engine start operation. If it is determined that there is an engine start operation at 303d, it is determined that there is large lowering in the voltage caused by the engine start operation (turning ON the starter 72) and that a voltage necessary for executing the initial drive is not secured. Then, the ECU 41 progresses to 307, and waits until a predetermined time period is elapsed in the state where there is no engine start operation (the state where there is no lowering in the voltage caused by turning ON the starter 72). Thereby, the initial drive learning process is prohibited until the predetermined time period passes since the engine start operation, when the engine start operation is detected. The prohibition of the initial drive operation is continued for the predetermined time period since the engine start operation, because the starter 72 continues to be ON until the engine speed exceeds a determination value determining the end of the startup even after the engine start operation is ended.

Then, when the predetermined time period is elapsed under the state where there is no engine start operation, it is determined that the required voltage is secured, and the ECU 41 progresses to 304. At 304, an initial drive operation is performed by the same method as the first embodiment to learn the correction value. Then, the ECU 41 progresses to 305, and determines whether the initial drive operation is succeeded. If it is determined that the initial drive operation is succeeded, the program will be ended. If it is determined that the initial drive operation is failed, the ECU 41 progresses to 306, and sets the flag prohibiting the initial drive operation ON to prohibit an initial drive operation.

According to the eleventh embodiment, the initial drive operation is prohibited until the predetermined time period is elapsed from the engine start operation when the engine start operation of the driver is detected. Thus, if the engine start operation of the driver is detected before the initial drive operation is started after energized, the initial drive operation is not started. Thereafter, a first time initial drive learning process is performed to learn the correction value quickly after the voltage becomes stable to the original state in response to the turning OFF of the starter 72.

Twelfth Embodiment

Figure 21:
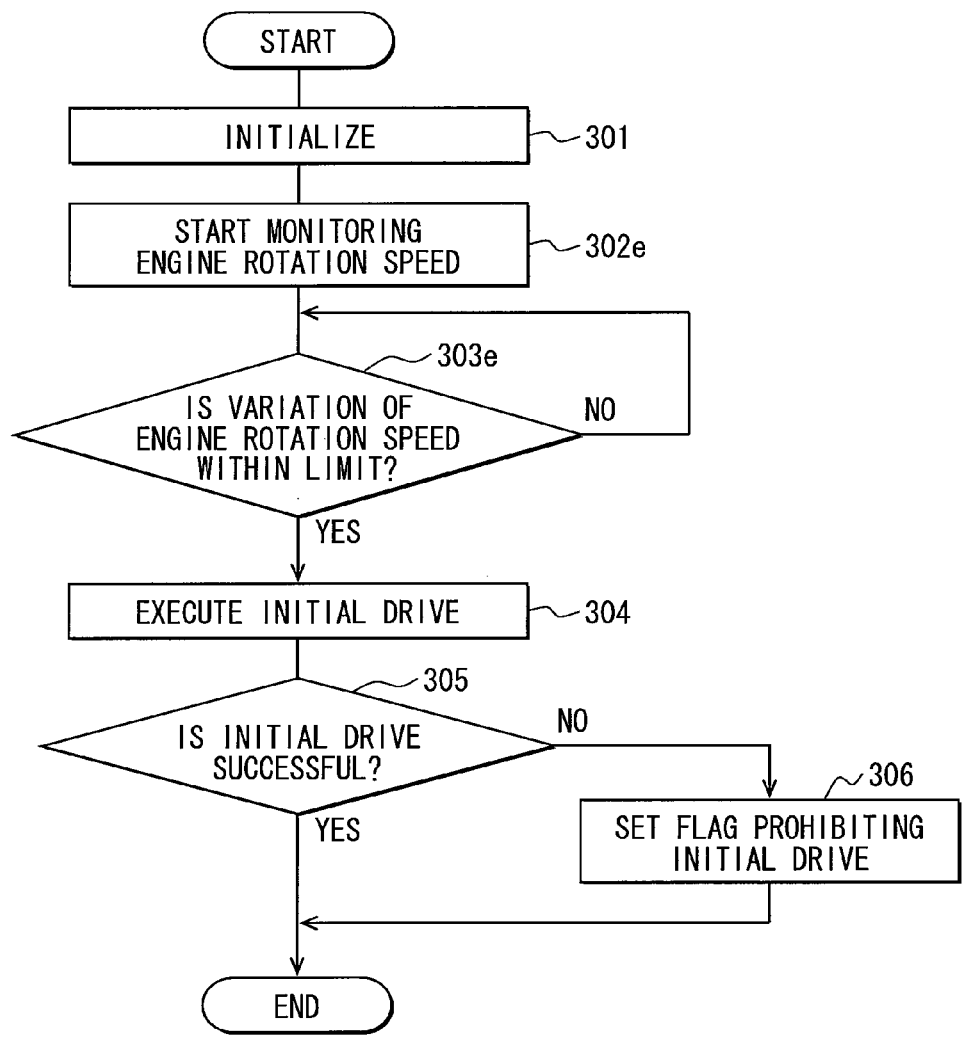
FIG. 21 is a flowchart illustrating a routine monitoring an initial drive operation according to a twelfth embodiment.

In a twelfth embodiment, a detector is provided to monitor a speed of the engine 71. The detector may be equipped in the ECU 41, which executes a program shown in FIG. 21. When the program is started, the flag prohibiting the initial drive operation is set OFF to allow an initial drive operation at 301.

Then, the ECU 41 progresses to 302e, and the monitoring of the speed of the engine 71 is started. At 303e, it is determined whether a variation in the speed is within a limit. If it is determined that a variation in the speed exceeds the limit at 303e, it is determined that a voltage necessary for executing the initial drive operation is not secured. Then, the ECU 41 waits until the variation in the speed becomes within the limit (or wait until the predetermined time period is elapsed in the state where the variation in the engine speed is within the limit.)

Then, when the variation in the speed becomes within the limit (or when the predetermined time period is elapsed in the state where the variation in the speed is within the limit), it is determined that the required voltage is secured, and the ECU 41 progresses to 304. At 304, an initial drive operation is performed by the same method as the first embodiment to learn the correction value. Then, the ECU 41 progresses to 305, and determines whether the initial drive operation is succeeded. If it is determined that the initial drive operation is succeeded, the program will be ended. If it is determined that the initial drive operation is failed, the ECU 41 progresses to 306, and sets the flag prohibiting the initial drive operation ON to prohibit an initial drive operation.

According to the twelfth embodiment, the initial drive operation is prohibited until the variation in the speed of the engine 71 becomes within the limit, when it is determined that the speed is varied beyond the limit. Thus, if the speed has large increasing when the starter 72 is turned ON before the initial drive operation is started after energized, the initial drive operation is not started. Thereafter, a first time initial drive learning process is performed to learn the correction value quickly after the voltage becomes stable to the original state in response to the turning OFF of the starter 72 to stabilize the speed of the engine 71.

Other Embodiments

The ECU 41 may conduct the initial drive learning process only once when a first time initial drive learning process is failed. The ECU 41 may repeat the initial drive learning process plural times until the initial drive learning process is succeeded when a first time initial drive learning process is failed.

The motor 12 can be applied to a variety of position switch control devices switching a position of an object as a drive source. For example, the electric motor 12 drives a range change mechanism that changes a shift range. In this case, even if the voltage supplied to the motor 12 becomes unstable temporally after energized, the initial drive learning process can be quickly conducted after the voltage recovers stable. Thus, the correction value can be accurately learned, and the shift range can be accurately switched into a target range.

The encoder 46 is not limited to the magnetic encoder. For example, an optical encoder or a brush encoder may be used in place of the magnetic encoder.

Further, the encoder 46 may output a Z-phase signal for correction (index) in addition to the A-phase signal and the B-phase signal.

Furthermore, the motor 12 is not limited to the SR motor. That is, in place of the SR motor, it is possible to use any other type of brushless synchronous motor, in which an exciting phase(s) is sequentially changed by sensing a rotational position of a rotor based on a count value of an output signal(s) of the encoder.

Furthermore, the present disclosure may be applied to a range change apparatus, in which a range change valve and a manual valve of the automatic transmission are changed synchronously with the rotational operation of the detent lever 15 to change the range to any one of the multiple ranges, such as the parking range (P-range), the reverse range (R-range), the neutral range (N-range) and the drive range (D-range) and the like.

The present disclosure is not limited to the automatic transmission (AT, CVT, DCT), and may be applied to other range change device that changes the shift range of the speed reducing mechanism for an electric vehicle.

Furthermore, the present disclosure is not limited to the range change apparatus and can be applied to any other types of position change apparatuses, which use the brushless synchronous motor (e.g., the SR motor) as its drive source.

Such changes and modifications are to be understood as being within the scope of the present disclosure as defined by the appended claims.

What is claimed is:

1. A motor control apparatus that controls rotation of a rotor of an electric motor powered from an electric power source, the motor control apparatus comprising:
    an encoder that outputs a pulse signal at predetermined angular intervals in response to the rotation of the rotor of the electric motor;
    a counter that counts the pulse signal output from the encoder;
    a learning portion that executes an initial drive learning process, the learning portion executing an initial drive operation to sequentially change an exciting phase of the electric motor using an open loop control after powered from the electric power source, correcting a count value of the counter by calculating a correction value based on a deviation of the exciting phase of the electric motor with respect to the count value of the counter, and learning the correction value in the initial drive learning process; and
    a controller that executes a normal drive operation to sequentially change the exciting phase of the electric motor based on the count value corrected by the correcting portion such that the rotor is rotated to a target position after the initial drive operation is finished, wherein
    the learning portion re-executes the initial drive learning process after a predetermined condition is satisfied, when the initial drive learning process is failed,
    the learning portion has a detecting portion which detects a voltage supplied to the electric motor from the electric power source, the learning portion re-executes the initial drive learning process after a variation in the voltage becomes smaller than or equal to a predetermined value, when it is determined that the variation in the voltage is larger than the predetermined value, and the learning portion re-executes the initial drive learning process after the voltage is raised to be higher than or equal to a predetermined value, when it is determined that the voltage is lowered to be lower than the predetermined value.

2. A motor control apparatus that controls rotation of a rotor of an electric motor powered from an electric power source, the motor control apparatus comprising:

an encoder that outputs a pulse signal at predetermined angular intervals in response to the rotation of the rotor of the electric motor;

a counter that counts the pulse signal output from the encoder;

a learning portion that executes an initial drive learning process, the learning portion executing an initial drive operation to sequentially change an exciting phase of the electric motor using an open loop control after powered from the electric power source, correcting a count value of the counter by calculating a correction value based on a deviation of the exciting phase of the electric motor with respect to the count value of the counter, and learning the correction value in the initial drive learning process; and a controller that executes a normal drive operation to sequentially change the exciting phase of the electric motor based on the count value corrected by the correcting portion such that the rotor is rotated to a target position after the initial drive operation is finished, wherein the learn portion re-executes the initial drive learning process after a predetermined condition is satisfied, when the initial drive learning process is failed;

the learning portion has a detecting portion which detects a current flowing through an electric load from the electric power source, and the learning portion re-executes the initial drive learning process after the current becomes lower than or equal to a predetermined value, when it is determined that the current is higher than the predetermined value.

3. A motor control apparatus that controls rotation of a rotor of an electric motor powered from an electric power source, the motor control apparatus comprising:

an encoder that outputs a pulse signal at predetermined angular intervals in response to the rotation of the rotor of the electric motor;

a counter that counts the pulse signal output from the encoder;

a learning portion that executes an initial drive learning process, the learning portion executing an initial drive operation to sequentially change an exciting phase of the electric motor using an open loop control after powered from the electric power source, correcting a count value of the counter by calculating a correction value based on a deviation of the exciting phase of the electric motor with respect to the count value of the counter, and learning the correction value in the initial drive learning process; and a controller that executes a normal drive operation to sequentially change the exciting phase of the electric motor based on the count value corrected by the correct-ing portion such that the rotor is rotated to a target position after the initial drive operation is finished, wherein the learning portion re-executes the initial drive learning process after a predetermined condition is satisfied, when the initial drive learning process is failed;

the learning portion has a detecting portion which detects a state of a starter used for starting an internal combustion engine, and the learning portion re-executes the initial drive learning process after the starter is turned off, when it is determined that the starter is turned on.

4. A motor control apparatus that controls rotation of a rotor of an electric motor powered from an electric power source, the motor control apparatus comprising:

an encoder that outputs a pulse signal at predetermined angular intervals in response to the rotation of the rotor of the electric motor;

a counter that counts the pulse signal output from the encoder;

a learning portion that executes an initial drive learning process, the learning portion executing an initial drive operation to sequentially change an exciting phase of the electric motor using an open loop control after powered from the electric power source, correcting a count value of the counter by calculating a correction value based on a deviation of the exciting phase of the electric motor with respect to the count value of the counter, and learning the correction value in the initial drive learning process; and a controller that executes a normal drive operation to sequentially change the exciting phase of the electric motor based on the count value corrected by the correcting portion such that the rotor is rotated to a target position after the initial drive operation is finished, wherein the learning portion re-executes the initial drive learning process after a predetermined condition is satisfied, when the initial drive learning process is failed;

the learning portion has a detecting portion which detects an operation for starting an internal combustion engine by a driver, and the learning portion re-executes the initial drive learning process when a predetermined time period is elapsed after the operation is detected, when it is determined that the operation is detected.

5. The motor control apparatus according to claim 1, wherein the learning portion re-executes the initial drive learning process plural times until the initial drive learning process is succeeded when a first initial drive learning process is failed.

6. The motor control apparatus according to claim 1, wherein the controller sets a rotation direction of the rotor of the electric motor to be opposite from that of a previous initial drive operation in a case where the initial drive learning process is re-executed when the initial drive learning process is failed.

7. The motor control apparatus according to claim 1, wherein the electric motor drives a range change mechanism that changes a shift range.

8. A motor control apparatus that controls rotation of a rotor of an electric motor powered from an electric power source, the motor control apparatus comprising:

an encoder that outputs a pulse signal at predetermined angular intervals in response to the rotation of the rotor of the electric motor;

a counter that counts the pulse signal output from the encoder;

a learning portion that executes an initial drive learning process, the learning portion executing an initial drive operation to sequentially change an exciting phase of the electric motor using an open loop control after powered from the electric power source, correcting a count value of the counter by calculating a correction value based on a deviation of the exciting phase of the electric motor with respect to the count value of the counter, and learning the correction value in the initial drive learning process; and a controller that executes a normal drive operation to sequentially change the exciting phase of the electric motor based on the count value corrected by the correcting portion such that the rotor is rotated to a target position after the initial drive operation is finished, wherein the learning portion prohibits the initial drive learning process until a predetermined condition is satisfied;

the learning portion has a detecting portion which detects a voltage supplied to the electric motor from the electric power source;

the learning portion prohibits the initial drive learning process until a variation in the voltage becomes smaller than or equal to a predetermined value, when it is determined that the variation in the voltage is larger than the predetermined value, and the learning portion prohibits the initial drive learning process until the voltage is raised to be higher than or equal to a predetermined value, when it is determined that the voltage is lowered to be lower than the predetermined value.

9. A motor control apparatus that controls rotation of a rotor of an electric motor powered from an electric power source, the motor control apparatus comprising:

an encoder that outputs a pulse signal at predetermined angular intervals in response to the rotation of the rotor of the electric motor;

a counter that counts the pulse signal output from the encoder;

a learning portion that executes an initial drive learning process, the learning portion executing an initial drive operation to sequentially change an exciting phase of the electric motor using an open loop control after powered from the electric power source, correcting a count value of the counter by calculating a correction value based on a deviation of the exciting phase of the electric motor with respect to the count value of the counter, and learning the correction value in the initial drive learning process; and a controller that executes a normal drive operation to sequentially change the exciting phase of the electric motor based on the count value corrected by the correcting portion such that the rotor is rotated to a target position after the initial drive operation is finished, wherein the learning portion prohibits the initial drive learning process until a predetermined condition is satisfied;

the learning portion has a detecting portion which detects a current flowing through an electric load from the electric power source, and the learning portion prohibits the initial drive learning process until the current becomes lower than or equal to a predetermined value, when it is determined that the current is higher than the predetermined value.

10. A motor control apparatus that controls rotation of a rotor of an electric motor powered from an electric power source, the motor control apparatus comprising:

an encoder that outputs a pulse signal at predetermined angular intervals in response to the rotation of the rotor of the electric motor;

a counter that counts the pulse signal output from the encoder;

a learning portion that executes an initial drive learning process, the learning portion executing an initial drive operation to sequentially change an exciting phase of the electric motor using an open loop control after powered from the electric power source, correcting a count value of the counter by calculating a correction value based on a deviation of the exciting phase of the electric motor with respect to the count value of the counter, and learning the correction value in the initial drive learning process; and a controller that executes a normal drive operation to sequentially change the exciting phase of the electric motor based on the count value corrected by the correcting portion such that the rotor is rotated to a target position after the initial drive operation is finished, wherein the learning portion prohibits the initial drive learning process until a predetermined condition is satisfied;

the learning portion has a detecting portion which detects a state of a starter used for starting an internal combustion engine, and the learning portion prohibits the initial drive learning process until the starter is turned off, when it is determined that the starter is turned on.

11. A motor control apparatus that controls rotation of a rotor of an electric motor powered from an electric power source, the motor control apparatus comprising:

an encoder that outputs a pulse signal at predetermined angular intervals in response to the rotation of the rotor of the electric motor;

a counter that counts the pulse signal output from the encoder;

a learning portion that executes an initial drive learning process, the learning portion executing an initial drive operation to sequentially change an exciting phase of the electric motor using an open loop control after powered from the electric power source, correcting a count value of the counter by calculating a correction value based on a deviation of the exciting phase of the electric motor with respect to the count value of the counter, and learning the correction value in the initial drive learning process; and a controller that executes a normal drive operation to sequentially change the exciting phase of the electric motor based on the count value corrected by the correcting portion such that the rotor is rotated to a target position after the initial drive operation is finished, wherein the learning portion prohibits the initial drive learning process until a predetermined condition is satisfied;

the learning portion has a detecting portion which detects an operation for starting an internal combustion engine by a driver, and the learning portion prohibits the initial drive learning process until a predetermined time period is elapsed after the operation is detected, when it is determined that the operation is detected.

12. A motor control apparatus that controls rotation of a rotor of an electric motor powered from an electric power source, the motor control apparatus comprising:
- an encoder that outputs a pulse signal at predetermined angular intervals in response to the rotation of the rotor of the electric motor;
- a counter that counts the pulse signal output from the encoder;
- a learning portion that executes an initial drive learning process, the learning portion executing an initial drive operation to sequentially change an exciting phase of the electric motor using an open loop control after powered from the electric power source, correcting a count value of the counter by calculating a correction value based on a deviation of the exciting phase of the electric motor with respect to the count value of the counter, and learning the correction value in the initial drive learning process; and
- a controller that executes a normal drive operation to sequentially change the exciting phase of the electric motor based on the count value corrected by the correcting portion such that the rotor is rotated to a target position after the initial drive operation is finished, wherein the learning portion prohibits the initial rive learning process until a predetermined condition is satisfied, the learning portion has a detecting portion which detects a speed of an internal combustion engine, and the learning portion prohibits the initial drive learning process until a variation in the speed of the internal combustion engine becomes smaller than or equal to a predetermined value, when it is determined that the variation in the speed of the internal combustion engine is larger than the predetermined value.

13. The motor control apparatus according to claim 8, wherein
the learning portion re-executes the initial drive learning process plural times until the initial drive learning process is succeeded when a first initial drive learning process is failed.

14. The motor control apparatus according to claim 8, wherein
the controller sets a rotation direction of the rotor of the electric motor to be opposite from that of a previous initial drive operation in a case where the initial drive learning process is re-executed when the initial drive learning process is failed.

15. The motor control apparatus according to claim 8, wherein
the electric motor drives a range change mechanism that changes a shift range.

16. The motor control apparatus according to claim 2, wherein
the learning portion re-executes the initial drive learning process plural times until the initial drive learning process is succeeded when a first initial drive learning process is failed.

17. The motor control apparatus according to claim 2, wherein
the controller sets a rotation direction of the rotor of the electric motor to be opposite from that of a previous initial drive operation in a case where the initial drive learning process is re-executed when the initial drive learning process is failed.

18. The motor control apparatus according to claim 2, wherein
the electric motor drives a range change mechanism that changes a shift range.

19. The motor control apparatus according to claim 3, wherein
the learning portion re-executes the initial drive learning process plural times until the initial drive learning process is succeeded when a first initial drive learning process is failed.

20. The motor control apparatus according to claim 3, wherein
the controller sets a rotation direction of the rotor of the electric motor to be opposite from that of a previous initial drive operation in a case where the initial drive learning process is re-executed when the initial drive learning process is failed.

21. The motor control apparatus according to claim 3, wherein
the electric motor drives a range change mechanism that changes a shift range.

22. The motor control apparatus according to claim 4, wherein
the learning portion re-executes the initial drive learning process plural times until the initial drive learning process is succeeded when a first initial drive learning process is failed.

23. The motor control apparatus according to claim 4, wherein
the controller sets a rotation direction of the rotor of the electric motor to be opposite from that of a previous initial drive operation in a case where the initial drive learning process is re-executed when the initial drive learning process is failed.

24. The motor control apparatus according to claim 4, wherein
the electric motor drives a range change mechanism that changes a shift range.

25. The motor control apparatus according to claim 9, wherein
the learning portion re-executes the initial drive learning process plural times until the initial drive learning process is succeeded when a first initial drive learning process is failed.

26. The motor control apparatus according to claim 9, wherein
the controller sets a rotation direction of the rotor of the electric motor to be opposite from that of a previous initial drive operation in a case where the initial drive learning process is re-executed when the initial drive learning process is failed.

27. The motor control apparatus according to claim 9, wherein
the electric motor drives a range change mechanism that changes a shift range.

28. The motor control apparatus according to claim 10, wherein
the learning portion re-executes the initial drive learning process plural times until the initial drive learning process is succeeded when a first initial drive learning process is failed.

29. The motor control apparatus according to claim 10, wherein
the controller sets a rotation direction of the rotor of the electric motor to be opposite from that of a previous initial drive operation in a case where the initial drive learning process is re-executed when the initial drive learning process is failed.

30. The motor control apparatus according to claim 10, wherein
the electric motor drives a range change mechanism that changes a shift range.

31. The motor control apparatus according to claim 11, wherein
the learning portion re-executes the initial drive learning process plural times until the initial drive learning process is succeeded when a first initial drive learning process is failed.

32. The motor control apparatus according to claim 11, wherein
the controller sets a rotation direction of the rotor of the electric motor to be opposite from that of a previous initial drive operation in a case where the initial drive learning process is re-executed when the initial drive learning process is failed.

33. The motor control apparatus according to claim 11, wherein
the electric motor drives a range change mechanism that changes a shift range.

34. The motor control apparatus according to claim 12, wherein
the learning portion re-executes the initial drive learning process plural times until the initial drive learning process is succeeded when a first initial drive learning process is failed.

35. The motor control apparatus according to claim 12, wherein
the controller sets a rotation direction of the rotor of the electric motor to be opposite from that of a previous initial drive operation in a case where the initial drive learning process is re-executed when the initial drive learning process is failed.

36. The motor control apparatus according to claim 12, wherein
the electric motor drives a range change mechanism that changes a shift range.

\* \* \* \* \*